United States Patent
Oochi et al.

(10) Patent No.: US 11,170,352 B2
(45) Date of Patent: Nov. 9, 2021

(54) GAME SYSTEM, VIRTUAL CURRENCY PROCESSING SYSTEM, PROCESSING METHOD, AND INFORMATION STORAGE MEDIUM

(71) Applicant: BANDAI NAMCO Entertainment Inc., Tokyo (JP)

(72) Inventors: Hiroaki Oochi, Tokyo (JP); Akio Onda, Warabi (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 116 days.

(21) Appl. No.: 15/714,322

(22) Filed: Sep. 25, 2017

(65) Prior Publication Data

US 2018/0096317 A1  Apr. 5, 2018

(30) Foreign Application Priority Data

Sep. 30, 2016  (JP) .............................. JP2016-195229

(51) Int. Cl.
*G06Q 20/06* (2012.01)
*G06Q 20/14* (2012.01)
(Continued)

(52) U.S. Cl.
CPC ............ *G06Q 20/065* (2013.01); *G06Q 20/12* (2013.01); *G06Q 20/123* (2013.01); *G06Q 20/14* (2013.01);
(Continued)

(58) Field of Classification Search
CPC .. G06Q 20/065; G06Q 20/12; G06Q 30/0209; G06Q 20/123; G06Q 30/0222; G07F 17/3255
See application file for complete search history.

(56) References Cited

U.S. PATENT DOCUMENTS 9,975,050 B1 * 5/2018 Pieron .................... A63F 13/50
10,286,324 B1 * 5/2019 McLellan ............... A63F 13/85
(Continued)

FOREIGN PATENT DOCUMENTS

CN  107875629 A  4/2018
JP  2015-139608 A  8/2015
(Continued)

OTHER PUBLICATIONS

Buchinger et al., "Virtual Currency for Online Platforms: Business Model Implications" (published in 2013 International Conference on e-Business (ICE-B) on Jul. 1, 2013) (Year: 2013).*
(Continued)

*Primary Examiner* — Abhishek Vyas
*Assistant Examiner* — Patrick Kim
(74) *Attorney, Agent, or Firm* — Posz Law Group, PLC

(57) ABSTRACT

A game system includes a processor including hardware. The processor is configured to implement: a game process for a user to play a game; a purchase process for the user to purchase a virtual currency; a management process that manages purchase information of the virtual currency of the user, in association with user information; and a shop process that sets a virtual shop in which the user is able to obtain an item of the game by spending the virtual currency purchased. The processor implements the shop process including a process that makes a special shop different from a regular shop appear as the shop, based on the purchase information of the virtual currency of the user.

17 Claims, 19 Drawing Sheets

(51) Int. Cl.
*G07F 17/32* (2006.01)
*G06Q 20/12* (2012.01)
*G06Q 30/02* (2012.01)
*G06Q 30/06* (2012.01)

(52) U.S. Cl.
CPC ..... *G06Q 30/0209* (2013.01); *G06Q 30/0212* (2013.01); *G06Q 30/0222* (2013.01); *G06Q 30/0641* (2013.01); *G07F 17/329* (2013.01); *G07F 17/3255* (2013.01)

(56) References Cited

U.S. PATENT DOCUMENTS

| | | | | |
|---|---|---|---|---|
| 2005/0182693 | A1* | 8/2005 | Alivandi | A63F 13/12 |
| | | | | 705/26.5 |
| 2011/0212762 | A1* | 9/2011 | Ocko | A63F 13/85 |
| | | | | 463/25 |
| 2013/0231999 | A1* | 9/2013 | Emrich | G06Q 30/0271 |
| | | | | 705/14.43 |
| 2014/0274359 | A1* | 9/2014 | Helava | A63F 13/00 |
| | | | | 463/29 |
| 2015/0209672 | A1* | 7/2015 | Otomo | A63F 13/533 |
| | | | | 463/31 |

FOREIGN PATENT DOCUMENTS

| | | |
|---|---|---|
| JP | 2015-192751 A | 11/2015 |
| JP | 2016-053766 A | 4/2016 |
| JP | 2018-055647 A | 4/2018 |

OTHER PUBLICATIONS

"Busou Shinki Battle Masters", Dengeki PlayStation, ASCII Media Works, XVI vol. 30, Nov. 30, 2010, pp. 156-158.

* cited by examiner

FIG. 9A

| GACHA | PROBABILITY OF WINNING RARE ITEMS ||
|---|---|---|
| | REGULAR SHOP | SPECIAL SHOP |
| GAC | 2% | 10% |

FIG. 9B

| GACHA | PROBABILITY OF WINNING RARE ITEMS |
|---|---|
| GASPA | 5% |
| GASPB | 20% |
| GASPC | 50% |

FIG. 10

PURCHASE INFORMATION

| USER ID | IDY | | | | |
|---|---|---|---|---|---|
| DATE AND TIME | PURCHASE AMOUNT | SPENDING AMOUNT | REMAINING AMOUNT | TOTAL PURCHASE AMOUNT | PURCHASE COUNT |
| ○○○ | □□□ | ——— | × × × | ○○○ | □□ |
| ○○○ | ——— | △△△ | × × × | ○○○ | □□ |
| ○○○ | □□□ | ——— | × × × | ○○○ | □□ |
| ○○○ | □□□ | ——— | × × × | ○○○ | □□ |
| ⋮ | ⋮ | ⋮ | ⋮ | ⋮ | ⋮ |

FIG. 11

| SHOP INFORMATION | | | | | |
|---|---|---|---|---|---|
| SHOP ID | TYPE | RANK | ITEM LIST OR VIRTUAL LOTTERY MACHINE LIST | APPEARANCE PERIOD INFORMATION | APPEARANCE FLAG |
| IDSA | TP1 | RKC | EA1, EA2, EA3 ··· | TAI | FLA |
| IDSB | TP1 | RKB | EB1, EB2, EB3 ··· | TBI | FLB |
| IDSC | TP1 | RKA | EC1, EC2, EC3 ··· | TCI | FLC |
| IDSD | TP1 | RKS | ED1, ED2, ED3 ··· | TDI | FLD |
| IDSE | TP2 | RKC | EE1, EE2, EE3 ··· | TEI | FLE |
| IDSF | TP2 | RKB | EF1, EF2, EF3 ··· | TFI | FLF |
| IDSG | TP2 | RKA | EG1, EG2, EG3 ··· | TGI | FLG |
| IDSH | TP2 | RKS | EH1, EH2, EH3 ··· | THI | FLH |
| ······ | ······ | ······ | ······ | ······ | ······ |

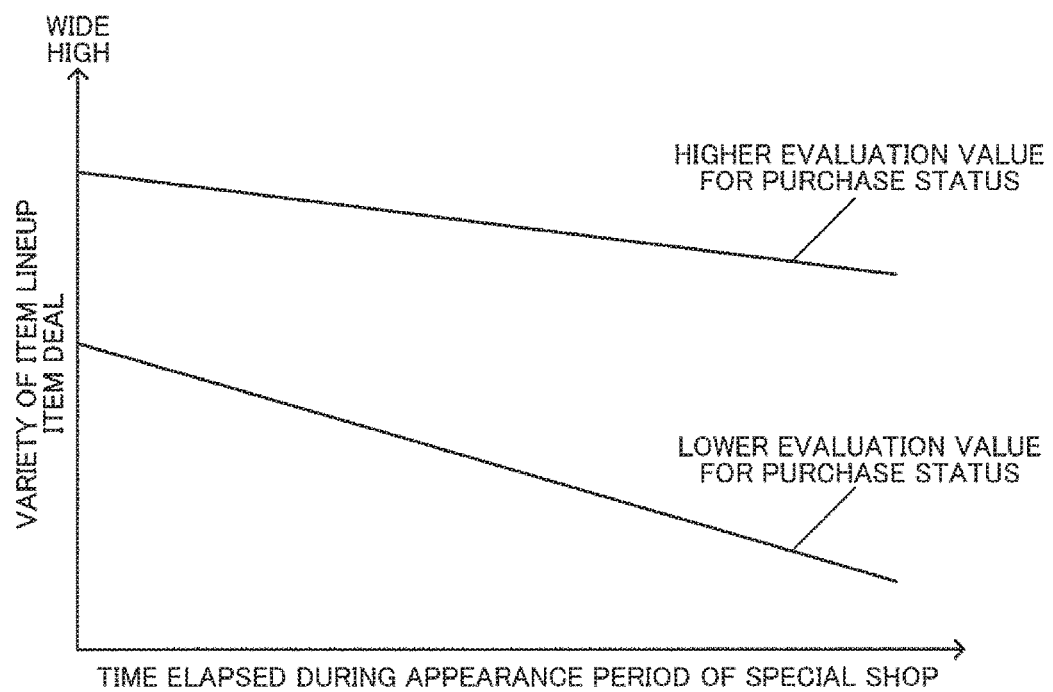

GAME SYSTEM, VIRTUAL CURRENCY PROCESSING SYSTEM, PROCESSING METHOD, AND INFORMATION STORAGE MEDIUM

This application incorporates the content of Japanese Patent Application No. 2016-195229 filed on Sep. 30, 2016.

BACKGROUND

The present invention relates to a game system, a virtual currency processing system, a processing method, an information storage medium, and the like.

Conventionally, game systems providing paid items usable in a game have been known. In such game system, the game item is provided to a user through a charging scheme (what is known as item charge). When this item charge is employed, the user purchases a virtual currency and uses the virtual currency to purchase the item. JP-A-2015-192751 discloses an example of a known conventional technique for performing such a process involving the virtual currency.

In such a game system, the user purchases the virtual currency, referred to as a game currency, through electronic payment or the like before purchasing an item or for the other like purposes. However, the user who has purchased the virtual currency might not purchase an item, resulting in the purchased virtual currency being unspent. When this happens, further purchasing of the virtual currency cannot be expected.

SUMMARY

According to one aspect of the invention, there is provided a game system comprising:
a processor comprising hardware,
the processor being configured to implement:
a game process for a user to play a game;
a purchase process for the user to purchase a virtual currency;
a management process that manages purchase information of the virtual currency of the user, in association with user information; and
a shop process that performs a setting process for a virtual shop in which the user is able to obtain an item of the game by spending the virtual currency purchased,
wherein the processor implements the shop process including a process that makes a special shop different from a regular shop appear as the shop, based on the purchase information of the virtual currency of the user.

According to another aspect of the invention, there is provided a virtual currency processing system comprising:
a processor including hardware,
wherein the processor being configured to implement:
a purchase process for a user to purchase a virtual currency;
a management process that manages purchase information of the virtual currency of the user, in association with user information; and
a shop process that sets a virtual shop in which the user is able to obtain an item by spending the virtual currency purchased,
wherein the processor implements the shop process including a process that makes a special shop different from a regular shop appear as the shop, based on the purchase information of the virtual currency of the user.

According to another aspect of the invention, there is provided a processing method comprising:

performing a game process for a user to play a game;
performing a purchase process for the user to purchase a virtual currency;
performing a management process that manages purchase information of the virtual currency of the user, in association with user information; and
performing a shop process that sets a virtual shop in which the user is able to obtain an item of the game by spending the virtual currency purchased,
wherein the shop process includes process that makes special shop different from a regular shop appear as the shop, based on the purchase information of the virtual currency of the user.

According to another aspect of the invention, there is provided a computer-readable information storage medium storing a program that causes a computer to perform the processing method as described above.

BRIEF DESCRIPTION OF THE DRAWINGS

FIG. 9A and FIG. 9B each illustrate a process that sets a probability of winning a rare item.

FIG. 10 illustrates an example of virtual currency purchase information.

FIG. 11 illustrates an example of shop information.

FIG. 15 illustrates a process that changes an item in accordance with the virtual currency purchase status.

DESCRIPTION OF EXEMPLARY EMBODIMENTS

Figure 1A:
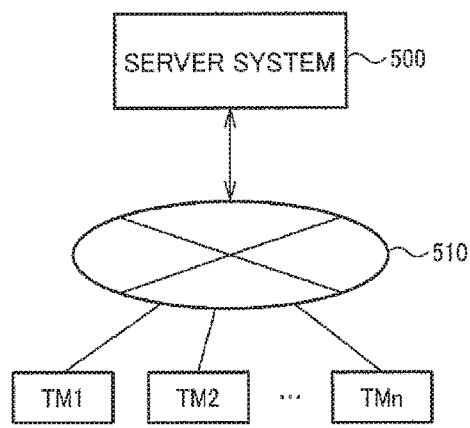
FIG. 1A to FIG. 1E illustrate a configuration example of a game system according to one embodiment.
Figure 1B:
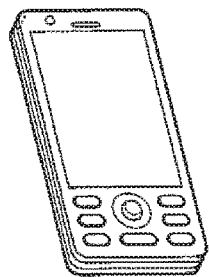
Figure 1C:
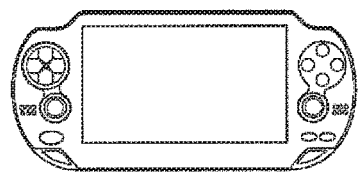
Figure 1D:
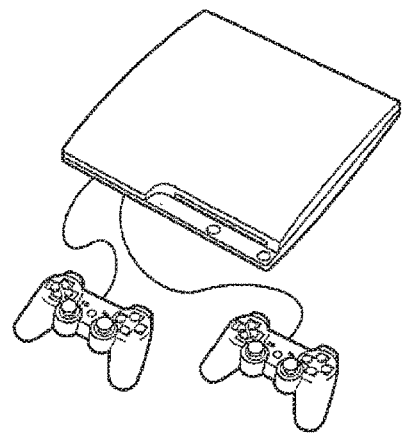
Figure 1E:
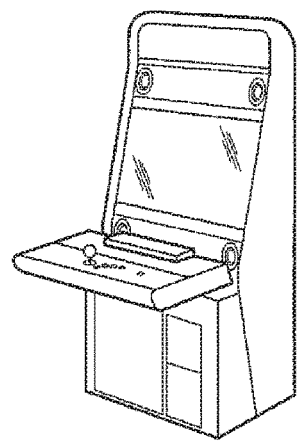

Several aspects of the invention may provide a game system, a virtual currency processing system and processing method, an information storage medium, and the like with which spending of a virtual currency can be effectively encouraged.

According to one embodiment of the present invention, there is provided a game system comprising:

a processor comprising hardware, the processor being configured to implement:

a game process for a user to play a game;

a purchase process for the user to purchase a virtual currency;

a management process that manages purchase information of the virtual currency of the user, in association with user information; and a shop process that performs a setting process for a virtual shop in which the user is able to obtain an item of the game by spending the virtual currency purchased, wherein the processor implements the shop process including a process that makes a special shop different from a regular shop appear as the shop, based on the purchase information of the virtual currency of the user.

In the present embodiment, when the user purchases the virtual currency, the purchase information of the virtual currency of the user is managed in association with the user information. Furthermore, the setting process that sets the shop in which an item can be obtained by spending the virtual currency purchased is performed. Furthermore, in the present embodiment, the process that makes the special shop that is different from the regular shop appear is performed based on the purchase information of the virtual currency of the user is performed. When such a special shop appears, the user is encouraged to spend the virtual currency to obtain the item in the special shop. Thus, the user can be effectively motivated to spend the virtual currency, whereby the game system or the like that can effectively encourage the spending of the virtual currency can be provided.

In the game system, wherein the processor may implement the shop process including making the special shop appear by changing the regular shop into the special shop.

With this configuration, an attempt to simplify the process of making the special shop appear, and to reduce a process load can be facilitated.

In the game system, wherein the processor may implement the shop process including making the special shop appear by selecting the special shop from a plurality of special shops with different settings on an obtainable item.

With this configuration, the special shop, selected from various special shops with different settings on an obtainable item, can appear.

In the game system, wherein the processor may implement the shop process including performing a setting process for the special shop to appear, in accordance with the virtual currency purchase status of the user.

With this configuration, the special shop corresponding to the virtual currency purchase status can appear, and thus the user can be effectively motivated to purchase the virtual currency.

In the game system, wherein the processor may implement the shop process including making the special shop in which an item is more advantageously obtainable for the user with a larger purchase amount or total purchase amount of the virtual currency or with a higher purchase frequency of the virtual currency appear.

With this configuration, the user is encouraged to purchase a larger amount of virtual currency and to quickly purchase an item, and thus can be effectively motivated to purchase the virtual currency.

In the game system, wherein the processor may implement the shop process including performing a setting process that sets an appearance period of the special shop in accordance with the virtual currency purchase status of the user.

With this configuration, the setting process that sets the appearance period of the special shop reflecting the virtual currency purchase status of the user can be implemented.

In the game system, wherein the processor may implement the shop process including enabling the user to obtain an item by spending the virtual currency to purchase the item or spend the virtual currency to perform a lottery process for the item.

With this configuration, the user can be enabled to obtain an item by paying the virtual currency to purchase the item or by paying the virtual currency to play a lottery.

In the game system, wherein the processor may implement the game process including performing a setting process that sets a game parameter for the game process in accordance with the virtual currency spending status of the user in the special shop.

With this configuration, the game parameter for the game process changes or the like in accordance with the virtual currency spending status, whereby the user can be encouraged to spend the virtual currency.

In the game system, wherein the processor may implement the game process including changing the setting of the game parameter to be more advantageous for a larger spending amount of the virtual currency or an earlier spending timing of the virtual currency in the special shop.

This configuration can encourage the user to spend a larger amount of virtual currency and to quickly spend the virtual currency.

In the game system, wherein the processor may implement the game process including performing a setting process that sets a parameter of a character corresponding to the user, in accordance with the virtual currency spending status of the user in the special shop.

With this configuration, the setting process that set the parameter of the character reflecting the virtual currency spending status of the user is implemented, so that the user can be effectively motivated to spend the virtual currency.

In the game system, wherein the processor may implement the game process including performing a change process that changes how the game progresses in accordance with the virtual currency spending status of the user in the special shop.

This configuration can achieve a game progress reflecting the virtual currency spending status of the user in the special shop.

In the game system, wherein the processor may implement the shop process including at least one of: a discount process that discounts an item in the special shop; and a change process that changes an item obtainable in the special shop, in accordance with the virtual currency spending status of the user in the special shop.

With this configuration, the user can be motivated by the item discount and change in the obtainable item to spend the virtual currency in the special shop.

In the game system, wherein the processor may implement the shop process including making a new special shop appear, in accordance with the virtual currency spending status of the user in the special shop.

With this configuration, the user can be motivated by the appearance of the new special shop to spend the virtual currency.

In the game system, wherein the processor may implement the game process including a process that causes a given game event, wherein the processor may implement, when the game event occurs, the shop process including making the special shop appear based on the purchase information of the virtual currency of the user.

With the special shop appearing based on the purchase information on the virtual currency when the game event occurs, the user can obtain the item corresponding to the occurring game event in the special shop, and thus can be effectively motivated to obtain the item.

The game system may further comprise a memory storing the purchase information of the virtual currency of the user in association with the user information.

In the present embodiment, the process that makes the special shop different from the regular shop appear, based on the purchase information of the virtual currency of the user is implemented. With such a special shop appearing, the user is encouraged to spend the virtual currency to obtain the item in this special shop. Thus, the user can be effectively motivated to spend the virtual currency, whereby the virtual currency processing system or the like that can effectively encourage the spending of the virtual currency can be provided.

According to another embodiment of the invention, there is provided a virtual currency processing system comprising:

a processor including hardware, wherein the processor being configured to implement:

a purchase process for a user to purchase a virtual currency;

a management process that manages purchase information of the virtual currency of the user, in association with user information; and a shop process that sets a virtual shop in which the user is able to obtain an item by spending the virtual currency purchased, wherein the processor implements the shop process including a process that makes a special shop different from a regular shop appear as the shop, based on the purchase information of the virtual currency of the user.

The exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Game System

First of all, an example of a configuration of a game system (in a broad sense, a virtual currency processing system) according to the present embodiment is described with reference to FIG. 1A to FIG. 1E.

In FIG. 1A, a server system 500 (information processing system) is communicably connected to terminal devices TM1 to TMn through a network 510. For example, the server system 500 is a host, and the terminal devices TM1 to TMn are clients. An example where the game system and processes thereof according to the present embodiment are mainly implemented by the server system 500 is described below. It is to be noted that, the game system and the processes thereof may be entirely or partially implemented by the terminal devices TM1 to TMn. In the description below, the terminal devices TM1 to TMn are collectively referred to as a terminal device TM as appropriate.

For example, the server system 500 may be implemented by one or a plurality of servers (a management server, a game server, a charge server, a service provider server, a contents distribution server, an authentication server, a database server, a communication server, or the like). The server system 500 provides various services for managing a community website and an online game, and can manage data required for implementing a game, and distribute a client program, various types of data, and the like. Thus, for example, a user can access the server system 500 with the terminal device TM, serving as his or her user terminal, to use a Social Networking Service (SNS) and play a social game that is an online game provided from the server system 500.

The network 510 (a distribution network or a communication line) is a communication channel implemented with the Internet, a wireless local area network (LAN), or the like and can include communication networks such as a telecommunication network, a cable network, and a wireless LAN as well as a LAN using a private line (private cable), Ethernet (registered trademark), and the like for direct connection. The communication method may be a wired communication method or a wireless communication method For example, the terminal device TM (a user terminal or a player terminal) has a network connection function (Internet connection function). Examples of the terminal devices TM include various devices such as a portable communication terminal (a smartphone or a cellphone) illustrated in FIG. 1B, a mobile game device illustrated in FIG. 1C, a consumer game device (stationary game device) illustrated in FIG. 1D, or an arcade game device illustrated in FIG. 1E. Furthermore, the terminal device TM may be an information processing device such as a personal computer (PC) and a tablet computer. Furthermore, the terminal device TM may be a wearable device (an HMD or a watch-type device) worn on a body part of the user such as the head or a wrist.

Figure 2:
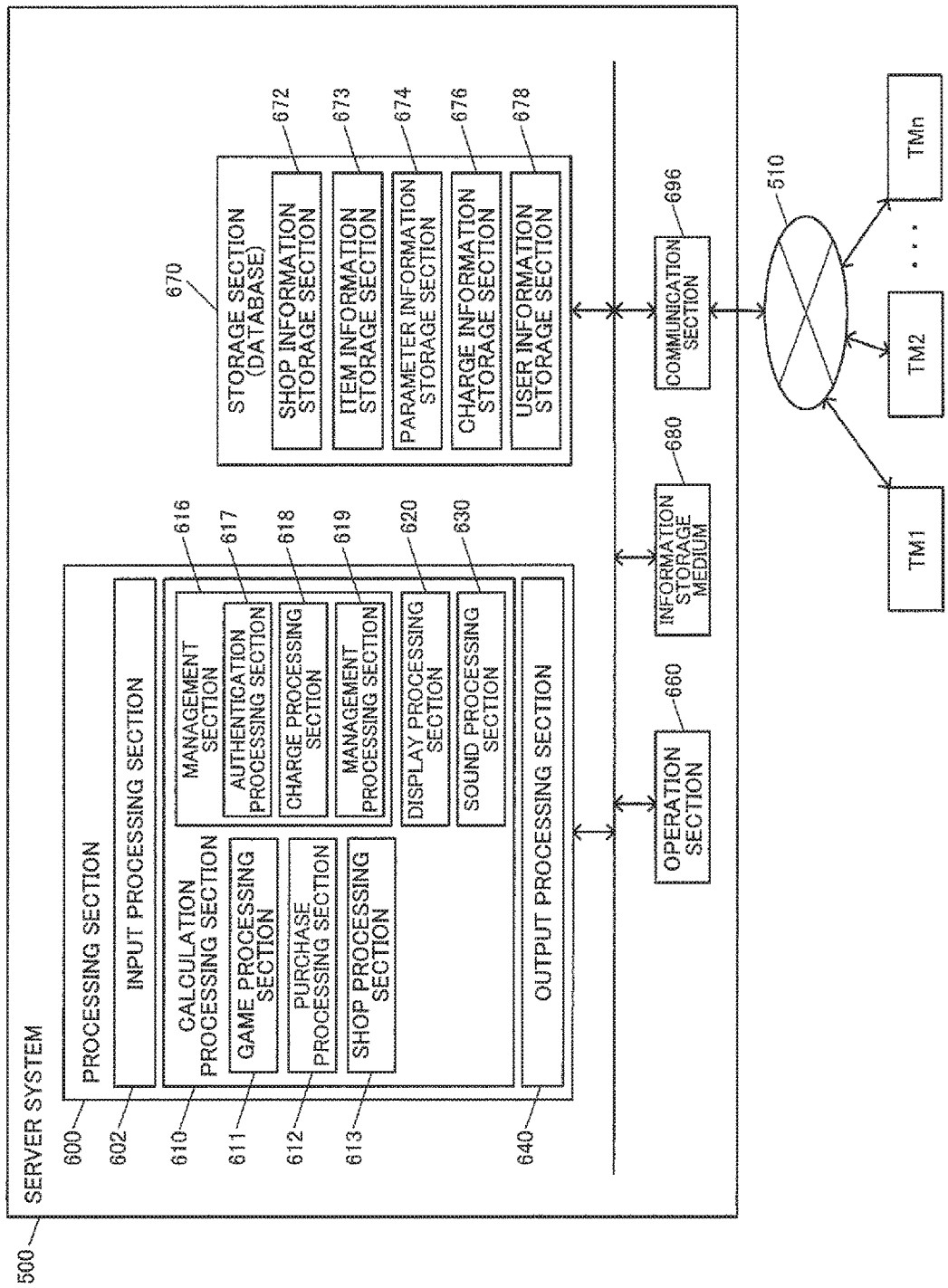
FIG. 2 illustrates a configuration example of a server system according to the embodiment.

FIG. 2 illustrates an example of a configuration of the server system 500 (game system) according to the present embodiment. The server system 500 includes a processing section 600, an operation section 660, a storage section 670, and a communication section 696. Note that the configuration of the server system 500 is not limited to the configuration illustrated in FIG. 2. Various modifications and variations may be made, such as omitting some of the elements (sections) illustrated in FIG. 2, or providing an additional element. Each process that is performed by the processing section 600 of the server system 500 may be implemented by a processing section 100 of the terminal device TM in FIG. 3 described later, or may be implemented through a distributed process performed by the processing section 600 of the server system 500 and the processing section 100 of the terminal device TM.

The processing section 600 (processor) performs a game process, a game result calculation process, a display process, a sound process, and various types of control or management processes required for the server, based on various types of information, programs, operation information, and the like stored in the storage section 670 (database).

Each process (each function) according to the present embodiment performed by each section of the processing section 600 (processing section 100) may be implemented by a processor (a processor including hardware). For example, each process according to the present embodiment may be implemented by a processor that operates based on information (e.g., program), and a memory that stores information (e.g., program). The processor may implement the function of each section with individual hardware, or may implement the function of each section with integrated hardware, for example. For example, the processor may include hardware, and the hardware may include at least one of a circuit that processes a digital signal and a circuit that processes an analog signal. For example, the processor may include one or more circuit devices (e.g., IC), and one or more circuit elements (e.g., resistor or capacitor) that are mounted on a circuit board. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The processor may include an amplifier circuit, a filter circuit, and the like that process an analog signal. The memory (storage sections 670, 170) may be a semiconductor memory (e.g., SRAM or DRAM), or may be a register. The memory may be a magnetic storage device such as a hard disk drive (HDD), or may be an optical storage device such as an optical disc device. For example, the memory stores a computer-readable instruction, and the process (function) of each section of the processing section 600 (processing section 100) is implemented by causing the processor to perform the instruction. The instruction may be an instruction set that is included in a program, or may be an instruction that instructs the hardware circuit included in the processor to operate.

The processing section 600 includes an input processing section 602, a calculation processing section 610, and an output processing section 640. The calculation processing section 610 includes a game processing section 611, a purchase processing section 612, a shop processing section 613, a management section 616, a display processing section 620, and a sound processing section 630. As described above, each process according to the present embodiment performed by each of these sections can be implemented by a processor (or by a processor and a memory).

The input processing section 602 performs an input process including: a process that receives operation information input through the operation section 660; a process that reads information from the storage section 670; and a process that receives information through the communication section 696. For example, the input processing section 602 performs an input process including: a process that acquires operation information detected by the operation section 660; a process that reads information, designated with a read instruction, from the storage section 670; and a process that receives information from an external device (a terminal device, another server system, or the like) provided outside the server system 500, through the network 510. The receiving process includes: a process that instructs the communication section 696 to receive information; and a process that acquires the information received by the communication section 696 and writing the information in the storage section 670.

The calculation processing section 610 performs various types of calculation processes. For example, a calculation process such as a game process, a purchase process, a shop process, a management process, a display process, or a sound process is performed.

The game processing section 611 (a program module for the game process) performs a game process. The game process includes: a process that starts the game when a game start condition has been satisfied; a process that progresses the game; or a process that terminates the game when a game termination condition has been satisfied, and the like. Furthermore, the game process may include: an object space setting process that sets an arrangement of a plurality of objects in an object space; a moving body process that moves (or operates) a moving body in the object space; a virtual camera control process that controls a virtual camera for generating an image in the object space as viewed from a given view point; a game result calculation process that calculates the game result of the user, or and the like.

The purchase processing section 612 (a program module for the purchase process) performs a process related to purchasing of a virtual currency. The shop processing section 613 (a program module for the shop process) performs a process related to a shop where an item can be obtained. These processes are described in detail later.

The management section 616 (a program module for the management process) includes an authentication processing section 617, a charge processing section 618, and a management processing section 619. The authentication processing section 617 performs an authentication process for a user. For example, the authentication process is performed for a user who has logged in with the terminal device TM. For example, the authentication process is performed based on information on an account and password input by the user or the like. The charge processing section 618 performs various types of charge processes (such as a charge determination process, a charge data generation process, and a storage process). The storage section 670 includes a charge information storage section 676 that stores charge information that is a target of the charge process by the charge processing section 618. The management processing section 619 performs various types of server management process. For example, a management process for various services provided by the server and a management process for various types of information such as server management information are performed.

For example, the user goes through a given procedure to acquire an account for using the services provided by the server system 500. Then, the user can log in by inputting a password associated with the account thus acquired, to use a player in the network game, as well as using various services including a service in a website for the game, online shopping for purchasing items and the like, message exchange with other users, and friend user registration. The management processing section 619 also performs a management process for the user account information as described above, and the like.

The display processing section 620 (a program module for the display process) performs a process that displays an image on a display section of the terminal device TM. For example, image generation data for generating the image is generated. Alternatively, control for displaying the image on a display section of the terminal device TM or the like may be performed. The sound processing section 630 (a program module for the sound process) performs a process that outputs sound from a sound output section of the terminal device TM or the like. For example, sound generation data for generating the sound (voice, game sound, sound effects) is generated. Alternatively, control for outputting sound from the sound output section of the terminal device TM or the like may be performed. The image generation data for generating an image is data for displaying an image generated through a method according to the present embodiment, on the terminal device TM or the like. The data may be the image data itself, or may be various types of data (setting data for a display screen, object data, or the like) used by the terminal device TM for generating an image. The same applies to the sound generation data generated by the sound processing section 630.

The output processing section 640 performs a process that outputs various types of information. For example, the output processing section 640 performs the outputting process including: a process that writes information in the storage section 670; and a process that transmits information through the communication section 696. For example, the output processing section 640 performs a process that writes information, designated with a write instruction, to the storage section 670 and a process that transits information to an external device (a terminal device, another server system, or the like) outside the server system 500 through the network 510. This transmission process includes: a process that instructs the communication section 696 to transmit information; and notifying the communication section 696 of the information to be transmitted.

The operation section 660 is used by an administrator (manager) of the system to input various types of information.

The storage section 670 stores various types of information, and may be in a database format to store various types of information, for example. The storage section 670 functions as a work area for the processing section 600 and the communication section 696. The functions of the storage section 670 can be implemented with a semiconductor memory, an HDD, an SDD, an optical disc device, or the like.

The storage section 670 includes a shop information storage section 672, an item information storage section 673, a parameter information storage section 674, a charge information storage section 676, and a user information storage section 678. The shop information storage section 672 stores various types of information on a shop. For example, this shop information includes: information on an ID, a rank, and a type of a shop, information that is a list of items or gacha. The item information storage section 673 stores various types of information on an item. For example, information such as an item ID and a game parameter set to the item is stored. The parameter information storage section 674 stores information on various parameters. For example, information on a parameter of a character and the like is stored. The charge information storage section 676 stores information on a charge process performed by the charge processing section 618. The user information storage section 678 stores user information including personal information (such as name, gender, birthday, and email address) on the user. For example, the user account information described above is stored as the user information. The charge information stored in the charge information storage section 676 is associated with the account information (user ID) of each user.

The information storage medium 680 (a computer readable medium) stores programs, data, and the like, and has a function that can be implemented by an optical disc (CD, DVD, and BD), an HDD, a semiconductor memory (ROM), or the like.

The communication section 696 communicates with the terminal device TM and the like through the network 510 by wired or wireless communications, and has a function that can be implemented by hardware such as a communication ASIC or communication processor, or by communication firmware.

Figure 3:
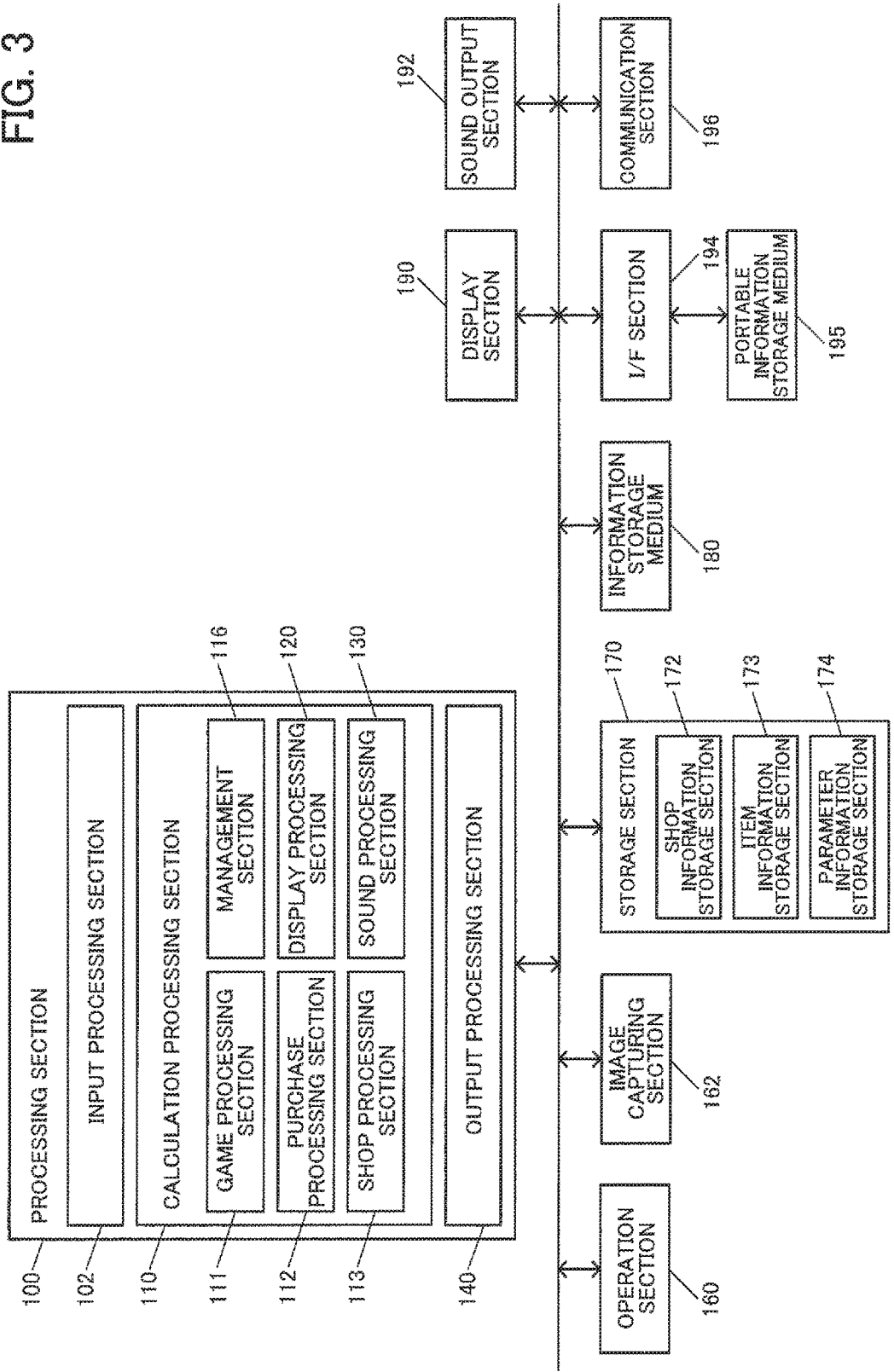
FIG. 3 illustrates a configuration example of a terminal device according to the embodiment.

FIG. 3 illustrates an example of a configuration of the terminal device TM (a user terminal, a client device, and a game device) according to the present embodiment. Note that the configuration of the terminal device TM is not limited to the configuration illustrated in FIG. 3. Various modifications and variations may be made, such as omitting some of the elements (sections) illustrated in FIG. 3, or providing an additional element.

The terminal device TM includes the processing section 100, an operation section 160, an image capturing section 162, a storage section 170, a display section 190, a sound output section 192, an I/F section 194, and a communication section 196.

The processing section 100 (processor) performs the game process, the game result calculation process, the display process, the sound process, and the like based on operation information, a program, and the like from the operation section 160. The processing section 100 can be implemented by a processor, or by a processor and a memory, as in the case of the processing section 600 illustrated in FIG. 2 described above.

The processing section 100 includes an input processing section 102, a calculation processing section 110, and an output processing section 140. The calculation processing section 110 includes a game processing section 111, a purchase processing section 112, a shop processing section 113, a management section 116, a display processing section 120, and a sound processing section 130.

The input processing section 102 performs an input process including: a process that receives the operation information input through the operation section 160; a process that reads information from the storage section 170; and a process that receives information through the communication section 196. For example, the input processing section 102 performs an input process including: a process that acquires operation information detected by the operation section 160; a process that reads information, designated with a read instruction, from the storage section 170; and a process that receives information from an external device (a server system, another terminal device, or the like) provided outside the terminal device TM, through the network 510. The game processing section 111 performs various types of game processes described above. The purchase processing section 112, the shop processing section 113, and the management section 116 respectively perform a purchase process, a shop process, and a management process. The display processing section 120 performs a process that displays an image on the display section 190. For example, when an image is generated on the terminal device side, a rendering process is performed based on a result of various types of processes (application process and game process) performed by the processing section 100, and a resultant image is output to the display section 190. When the image is generated on the server side, a process that displays an image based on the image information from the server system on the display section 190 is performed. The sound processing section 130 performs sound control based on a result of various types of processes performed by the processing section 100. As a result, BGM, sound effects, voice, or the like is output from the sound output section 192. The game process, the purchase process, the shop process, the management process, the display process, the sound process, or the like according to the present embodiment may be implemented through a process performed by any one of the server system 500 and the terminal device TM, or may be implemented through a distributed process performed by the server system 500 and the terminal device TM. For example, in a standalone game system involving no network, the process according to the present embodiment is performed by the terminal device TM serving as the game system.

The operation section 160 allows the player (user) to input various types of information such as the operation information. The functions of the operation section 160 may be implemented by an operation button, a direction key, an analog stick, a lever, various types of sensors (e.g., angular speed sensor or acceleration sensor), a microphone, a touch panel display, or the like.

The image capturing section 162 (camera) captures an image of a subject, and is implemented by an optical system including image sensors such as a CCD and a CMOS sensor, and a focus lens.

The storage section 170 serves as a work area for the processing section 100, the communication section 196, and the like. The function of the storage section 170 may be implemented by a semiconductor memory, an HDD, an SDD, an optical disc device, or the like. The storage section 170 includes a shop information storage section 172, an item information storage section 173, and a parameter information storage section 174.

The information storage medium 180 (computer readable medium) stores programs, data, and the like. The function of the information storage medium 180 can be implemented by an optical disc, an HDD, a semiconductor memory, and the like. The processing section 100 performs various types of processes according to the present embodiment based on the programs (data) stored in the information storage medium 180. A program that causes a computer (i.e., a device that includes an operation section, a processing section, a storage section, and an output section) to function as each section according to the present embodiment (i.e., a program that causes a computer to perform the process of each section) may be stored in the information storage medium 180.

The display section 190 outputs an image generated according to the present embodiment. The function of the display section 190 may be implemented by an LCD, an organic EL display, a CRT, an HMD, or the like. The sound output section 192 outputs sound generated according to the present embodiment. The function of the sound output section 192 may be implemented by a speaker, a headphone, or the like.

The I/F section 194 performs an interface process that interfaces with a portable information storage medium 195. The function of the I/F section 194 may be implemented by an I/F processing ASIC or the like. The portable information storage medium 195 allows the user to store various types of information. The portable information storage medium 195 is a storage device that can hold the information even when the supply of power has been stopped. The portable information storage medium 195 may be implemented by an IC card (memory card), a USB memory, a magnetic card, or the like.

The communication section 196 communicates with the server system 500 or an external device (e.g., another terminal device) through the network 510. The function of the communication section 196 may be implemented by hardware (e.g., a communication ASIC or communication processor), or communication firmware.

A program (data) that causes a computer to function as each section according to the present embodiment may be distributed to the information storage medium 180 (or the storage section 170) from an information storage medium included in a server system (host device) through a network and the communication section 196. Use of the information storage medium included in the server system is also intended to be included within the scope of the invention.

In the present embodiment, as illustrated in FIG. 2, the server system 500 (or the terminal device TM) serving as the game system includes a game processing section 611 (game processing section 111), a purchase processing section 612 (purchase processing section 112), and a shop processing section 613 (shop processing section 113). An example where the game system according to the present embodiment is implemented by the server system 500 is mainly described below. However, the present embodiment is not limited to this. The game system may be implemented by the terminal device TM or may be implemented through a distributed process by the server system 500 and the terminal device TM.

The game processing section 611 (game processing section 111, the same applies to this term in the following description) performs a game process for the user (player) to play the game. For example, a process that progresses the game, a process that updates the game parameter, process that calculates the game result, and the like are performed. The game process is performed based on information on the game parameter and the like stored in the parameter information storage section 674 (parameter information storage section 174, the same applies to this term in the following description).

The purchase processing section 612 (purchase processing section 112, the same applies to this term in the following description) performs a process for the user to purchase a virtual currency. For example, a process that receives a request for purchasing the virtual currency from the user, a process that receives information on a purchase amount of the virtual currency, and the like are performed. The management section 616 manages the purchase information of the virtual currency of the user in association with the user information. For example, the purchase information is stored in the user information storage section 678 while being associated with the user information. For example, the purchase processing section 612 (game system) performs a process related to purchasing of the virtual currency, in cooperation with an external electronic payment server managed by an electronic payment company or the like. The virtual currency is also referred to as game currency, and is a virtual currency usable in the game. The electronic payment server performs a process that finalizes the purchase amount of the virtual currency with a user's credit card, prepaid card, or the like, in response to a request from the purchase processing section 612. For example, the virtual currency is purchased by the user through electronic payment or the like. When the virtual currency is purchased, the virtual currency (game point) corresponding to the purchase amount finalized is given to the user. Specifically, the management section 616 stores the virtual currency purchased by the user in the user information storage section 678 in association with the user ID of the user.

The shop processing section 613 (shop processing section 113, the same applies to this term in the following description) performs a process that sets a virtual shop in which the user can obtain a game item by spending the purchased virtual currency. The shop is a virtual shop existing in the game space (network space). The user may obtain an item by paying (spending) the virtual currency to directly purchase an item. Furthermore, the user may pay (spend) the virtual currency so that a lottery process is performed with a virtual lottery machine (gacha and the like), and obtain an item (such as a rare item) as a result of the lottery process. Thus, examples of the shop in which an item can be obtained (acquired) include: a shop in which an item can be purchased; and a shop in which an item can be obtained through a lottery played with a virtual lottery machine. The shop setting process is a process that makes the shop appear and a process that makes various types of setting related to the shop. The item is a game display object that can be used in the game or the like. The item may be various game items including: equipment such as a weapon and a protection; and a material for recovery, dressing up, or the like.

The shop processing section 613 performs a process that makes a special shop (specialty shop or unique shop) appear based on the virtual currency purchase information of the user. For example, a special shop that is different from regular shops appears (opens) as the shop (virtual shop). For example, the shop processing section 613 reads the purchase information of the virtual currency associated with the user information from the user information storage section 678 (purchase information storage section). The process that makes the special shop appear is performed based on the purchase information thus read. For example, the shop processing section 613 determines whether an appearance condition of the special shop has been satisfied based on the virtual currency purchase amount in the purchase information and the like. The special shop appears when the appearance condition has been satisfied. For example, the process that makes the special shop appear at least includes a process that makes an item that can be obtained in the special shop recognizable to the user. For example, the process is performed for displaying (presenting) information on the item that can be obtained in the special shop to the user. Specifically, the process is performed for displaying a screen of the special shop. Furthermore, the process may be performed to notify the user that the special shop has appeared.

Here, for example, the shop processing section 613 makes the special shop appear by changing the regular shop into the special shop. For example, the process that changes the regular shop into the special shop includes: a process that makes an item unique to the special shop to be obtainable in addition to an item obtainable in the regular shop; a process that changes the content of an item obtainable in the regular shop to be an item in the special shop; and a process that changes the item lineup or item deals in the regular shop.

The shop processing section 613 can make the special shop appear by selecting one of a plurality of special shops with different settings on obtainable (purchasable) items. For example, the shop information storage section 672 (shop information storage section 172, the same applies to this term in the following description) stores shop information including information on the plurality of special shops in advance. Then, a process that extracts a special shop from the shop information is performed to select a special shop to be presented to the user. The plurality of special shops include at least two special shops with different settings on obtainable item (such as type, content, or the lineup).

The shop processing section 613 performs a process that sets a special shop to appear, in accordance with the virtual currency purchase status of the user. This process that sets the shop includes: a process that changes a regular shop into a special shop; a process that selects a special shop to appear from the plurality of special shops; and a process that performs various types of setting for the details or the like of the special shop. For example, the virtual currency purchase status of the user includes at least one of a purchase amount, a total purchase amount, a purchase frequency, and a purchase timing (when was the currency purchased) of the virtual currency purchased by the user.

The shop processing section 613 makes a special shop in which an item is more advantageously obtainable appear for a user with a larger purchase amount or a larger total purchase amount of the virtual currency or a higher virtual currency purchase frequency. The purchase amount, the total purchase amount, and the purchase frequency of the virtual currency serve as the purchase information associated with the user information. For example, the total purchase amount is obtained by a process that sums up (integrates) the amount of the virtual currency purchased by the user so far. For example, the purchase frequency is an index indicating the frequency of the purchase, and can be determined based on the number of times the virtual currency has been purchased, the purchase amount of each purchase, or the like. The items being more advantageously obtainable includes: items with a higher rarity or rank being obtainable; items being obtainable (through purchase or lottery) with a smaller amount of the virtual currency; and a wider variety of item lineup being offered.

The shop processing section 613 performs a process that sets an appearance period of the special shop in accordance with the virtual currency purchase status of the user. For example, the process that sets the appearance period (open period) of the special shop includes: a process that changes the appearance period; a process that changes the length of the appearance period; and process that changes a start timing and an end timing of the appearance period. For example, the length of the appearance period of the special shop is set to be longer with a larger purchase amount or a larger total purchase amount of the virtual currency or a higher purchase frequency. The process that sets the appearance period may include a process that sets (changing) various parameters, related to the appearance period, such as the item lineup or item deals during the appearance period.

The shop processing section 613 enables the user to spend the virtual currency to purchase the item or to spend the virtual currency to perform a lottery process, to obtain an item. For example, the user is enabled to pay the virtual currency to purchase an item, or pay the virtual currency to play a lottery with the virtual lottery machine to obtain an item.

The game processing section 611 performs a process that sets a game parameter in the game process, based on the virtual currency spending status of the user in the special shop. For example, a process that changes the game parameter, a process that sets the game parameter to various values, and the like are performed. The virtual currency spending status of the user in the special shop is, for example, a spending amount (paid amount, a purchase amount for an item) of the virtual currency, a spending timing of the virtual currency, or the spending frequency of the virtual currency in the special shop. For example, the game processing section 611 changes the setting of a game parameter to be more advantageous for a larger spending amount of the virtual currency, or an earlier spending timing of the virtual currency, in the special shop. The game parameter is used for a game process (such as a game progress process). For example, the game parameter may be various parameters including a parameter of a character (user character), a parameter of an item, and a parameter for a game progress process. The parameter of a character represents a status, ability, and the like of the character (user). For example, the game parameter for a character includes: a parameter representing an ability (fighting strength, defense, intellect, and the like) of the character; a status parameter representing the character's physical and mental conditions; a parameter representing an attribute of the character, a parameter related to a behavior of the character; and a parameter representing a character's possession. The parameter of an item represents an ability (fighting strength, defense, and the like), attribute, condition, and the like of the item. For example, changing the setting of the game parameter to be more advantageous includes: changing the game parameter to be more advantageous in the game; and changing the game parameter so that various benefits can be obtained in the game. For example, the ability represented by the game parameter may be enhanced, or effect of an action involving the game parameter is increased. For example, the game processing section 611 performs a process that sets a parameter of a character (a user character, corresponding to the user, in a game space) corresponding to the user, in accordance with the virtual currency spending status of the user in the special shop. For example, the process that changes the parameter of the character in accordance with the virtual currency spending status is performed. For example, the character corresponding to the user is an avatar of the user appearing in the game world. For example, the character is operated to make actions, based on the operation information from the user.

The game processing section 611 performs a process that changes the progress of the game in accordance with the virtual currency spending status of the user in the special shop. For example, the progress of the game is changed with various game events occurring in accordance with the virtual currency spending status. For example, how the game progresses changes in accordance with the virtual currency spending status. For example, a more beneficial game event occurs for a user with a large spending amount (payment amount or spending amount) of the virtual currency in the special shop, so that the user can have an easier time playing the game.

The shop processing section 613 performs at least one of a discount process and a change process for an item obtainable in the special shop, in accordance with the virtual currency spending status of the user in the special shop. For example, the item discount process is for reducing the spending amount (payment amount) of the virtual currency required to obtain the item. The change process for the item obtainable in the special shop includes: changing the item lineup in the special shop; changing item deal; and changing the detail of the item (setting details or a game parameter value).

The shop processing section 613 makes a new special shop appear in accordance with the virtual currency spending status of the user in the special shop. For example, a special shop that has been unavailable to the user newly appears (opens). For example, for a user with a large virtual currency spending amount or the like in a special shop, a special shop (shop with a different item lineup, item content, and the like) different from the special shop is newly presented.

The game processing section 611 causes a given game event through a game process. When the game event occurs, the shop processing section 613 makes a special shop appear based on the virtual currency purchase information of the user. For example, the shop appears when a given game event occurs, with an appearance condition based on the virtual currency purchase information of the user (for example, purchasing a given amount of the virtual currency or more) satisfied. In this case, for example, a special shop in which the item corresponding to the game event that has occurred can be obtained appears.

The item corresponding to the game event achieves more advantageous setting for the user. For example, the item achieves more advantageous setting for the user in an occurring game event. In other words, an "item corresponding to a game event" makes the game event easier to finish when used during the game event. For example, the item used in the corresponding game event that has occurred can make the game event easier to finish, compared with a case where the item is used for the other game events. Alternatively, an item corresponding to the game event may be a target of fusion with an item obtained in the game event.

For example, the game event caused by the game processing section 611 is an important and special event for the user playing the game. An example of such a game event includes appearance of a given character such as a boss character with extremely high ability values. When the game event in which the given character such as the boss character appears occurs with an appearance condition based on the virtual currency purchase information of the user satisfied, the shop processing section 613 makes a special shop in which an item effective for this given character can be obtained appear. For example, the item obtainable in the special shop thus having appeared makes the setting more advantageous for the user when used during the game event in which the given character appears. Alternatively, the item makes the game event easier to finish (easier to defeat the given character), when used during the game event in which the given character appears. Furthermore, the user may obtain a possessed item of a given character by defeating the given character. In such a case, an item to be a target of fusion with the possessed item may be obtainable in special shop having appeared.

A system according to the present embodiment may be a virtual currency processing system (virtual currency spending system) including: the purchase processing section 612 performing the process for the user to purchase the virtual currency; the management section 616 managing the purchase information of the virtual currency of the user in association with the user information; and the shop processing section 613 performing a setting process for a virtual shop in which the user is able to obtain an item by spending the virtual currency purchased. For example, the items, including items usable in the game, may further include various products (such as merchandise) acquirable (purchasable) with the virtual currency. The shop processing section 613 makes a special shop, different from regular shops, appear as the shop based on the virtual currency purchase information of the user. For example, the special shop appears with acquirable items different from items acquirable in the regular shop.

In the description above, the server system 500 in FIG. 2 performs the game process, the purchase process, the shop process, the management process, and the like according to the present embodiment. However, the present embodiment is not limited to this. For example, the game process, the purchase process, the shop process, the management process, and the like according to the present embodiment described above may be partially or entirely performed by the terminal device TM in FIG. 3. In this configuration, the terminal device TM (or a system as a combination of the terminal device and the server system) functions as the game system according to the present embodiment.

2. Method According to the Present Embodiment

Next, a method according to the present embodiment is described in detail below. An example where the method according to the present embodiment is applied to a battle game with characters is mainly described below. Still, the method according to the present embodiment may be applied to various games (RPG, action game, racing game, competitive game, simulation game, card game, sport game, quiz game, puzzle game, communication game, music game, or the like). The method may even be applied to something other than games.

2.1 Appearance of Special Shop

Figure 4:
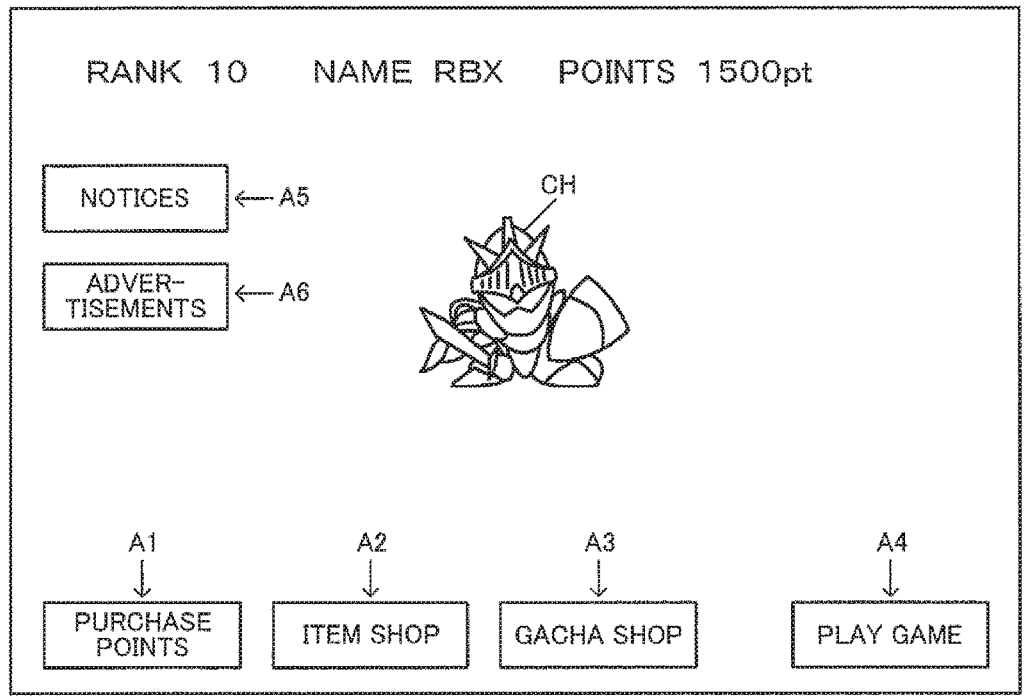
FIG. 4 illustrates an example of a home screen of a game.

FIG. 4 illustrates an example a home screen (main screen or my page screen) implemented by the game system according to the present embodiment. In FIG. 4, an image, rank, name, and information on various statuses such as a possessed point corresponding to the virtual currency of a character CH (user character) is displayed. When the user selects (touches when a touch screen is displayed, the same applies to this context in the following description) an icon (tab) A1, the screen transitions to a screen for purchasing points corresponding to the virtual currency. When an icon A2 or A3 is selected, the screen transitions to a screen for an item or gacha shop. When an icon A4 is selected, the screen transitions to a screen for the battle game. Various notices are displayed in A5. For example, the user may be notified that the special shop has appeared through the notice screen in A5. Various advertisements are displayed in A6. An advertisement for the special shop may be displayed.

Figure 5:
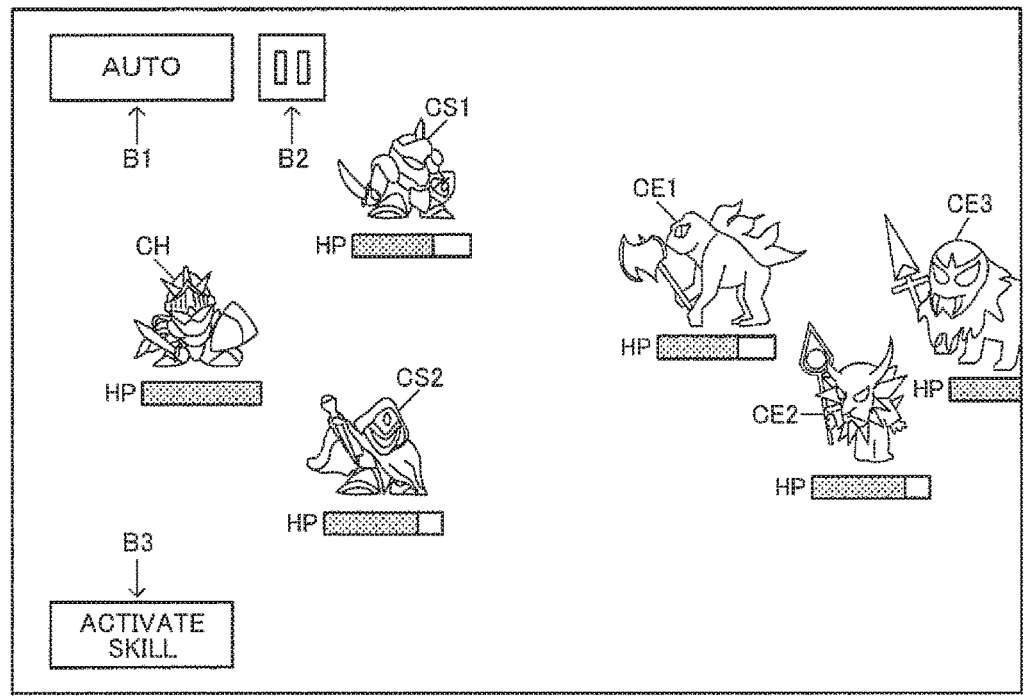
FIG. 5 illustrates an example a game image.

When the user selects the icon A4 for playing the game in FIG. 4, the game on a game screen as illustrated in FIG. 5 can be played. In the game illustrated in FIG. 5, the user character CH and its subordinate characters CS1 and CS2 battle with enemy characters CE1, CE2, and CE3. The user touches and thus selects a desired character from the characters CH, CS1, and CS2 with his or her finger, and performs a slide operation or the like to determine an attacking target, thereby attacking the enemy character CE1, CE2, or CE3. The user may select an icon B1 to implement an auto battle mode. An icon B2 is selected to temporarily stop the auto battle mode. The characters CH, CS1, and CS2 each have a skill that can be activated when an icon B3 is selected.

The user selects the icon A1 to purchase the virtual currency. As a result, the screen for purchasing the virtual currency is displayed, and the virtual currency can be purchased by paying a given amount through electronic payment or the like.

The user who has purchased the virtual currency can purchase an item in the item shop, by spending the point as the purchased virtual currency (paying the virtual currency). Furthermore, the user can play the gacha lottery with a virtual lottery machine by spending the point as the purchased virtual currency. The user who has won the lottery can obtain a rare item or the like.

For example, the user selects the icon A2 in FIG. 4 to purchase a game item in the shop. As a result, an item shop screen described with reference to FIG. 6A to FIG. 7B is displayed.

Figure 6A:
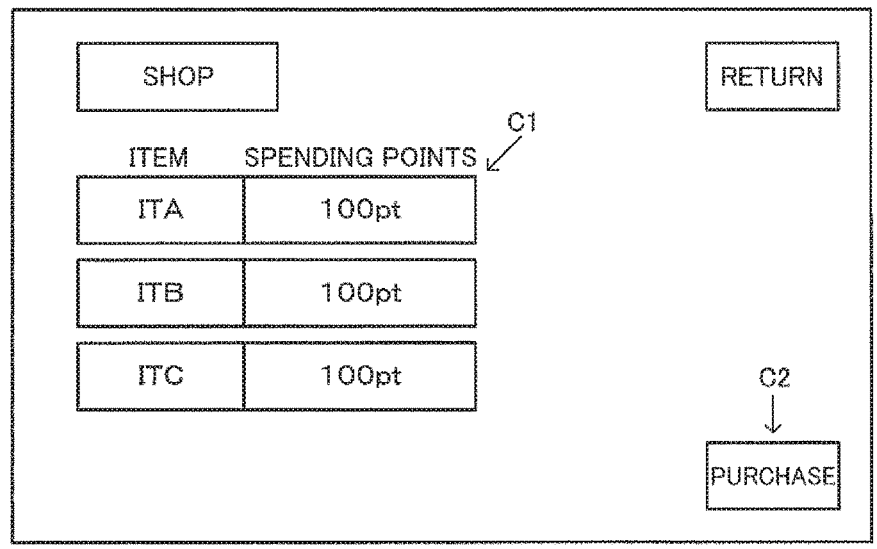
FIG. 6A and FIG. 6B each illustrate a special shop for items.

FIG. 6A illustrates a shop screen of a regular shop. Items ITA, ITB, and ITC purchasable (obtainable, in a broad sense) in the regular shop are presented in C1 in FIG. 6A as item lineup. The user selects a desired one of the items ITA, ITB, and ITC and selects a purchase icon C2, and thus can purchase the item. The purchasing involves spending of the point as the virtual currency corresponding to the purchased item. For example, in FIG. 6A, the virtual currency of 100 points is spent for purchasing each of the items ITA, ITB, and ITC.

In this manner, a purchase process for the user to purchase the virtual currency is performed. For example, when the user touches the icon A1 in FIG. 4 to purchase the virtual currency, a request for the purchase is accepted, whereby the user can purchase the virtual currency usable in the game through the electronic payment or the like. The virtual currency may be set to various rates. For example, one point of the virtual currency may correspond to one yen or 10 yen, or may even correspond to a value smaller than one yen or larger than 10 yen. The purchase information of the virtual currency of the user is stored in the user information storage section 678 illustrated in FIG. 2 while being associated with user information. For example, the purchase information includes information such as a purchase amount and purchase date and time of the virtual currency. As illustrated in FIG. 6A, the shop in which the user can obtain the item by spending the purchased virtual currency is prepared. The shop is a virtual shop (a shop different from shops in the physical world) prepared in the game space (network space). For example, when the user selects a desired item in C1 in FIG. 6A, and then selects the purchase icon C2, the user can purchase (obtain, in a broad sense) the item by spending the virtual currency of the user that has been stocked.

In this process, in the present embodiment, a special shop, different from regular shops, appears based on the virtual currency purchase information of the user. For example, the special shop appears based on the virtual currency purchase amount of the user. For example, the special shop opens when an appearance condition for the special shop is satisfied, with the user purchasing a given amount of the virtual currency or the like.

Figure 6B:
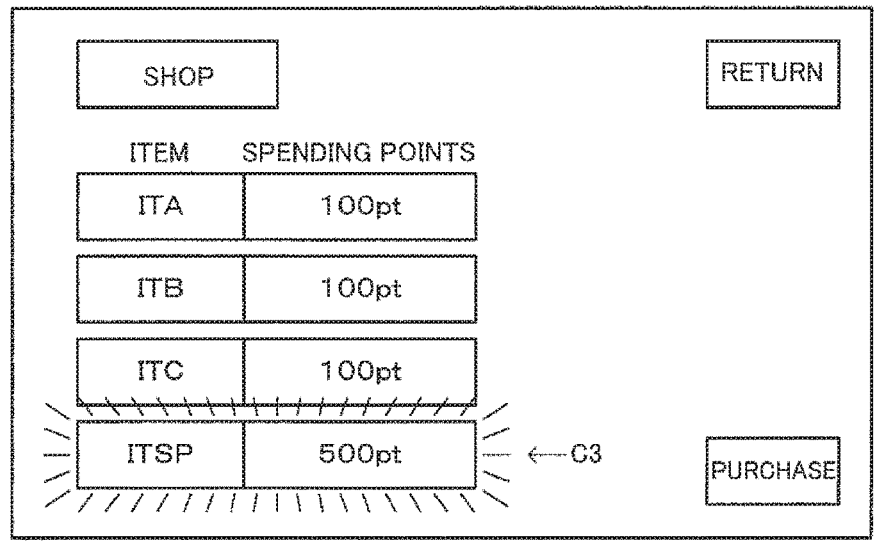
Figure 7A:
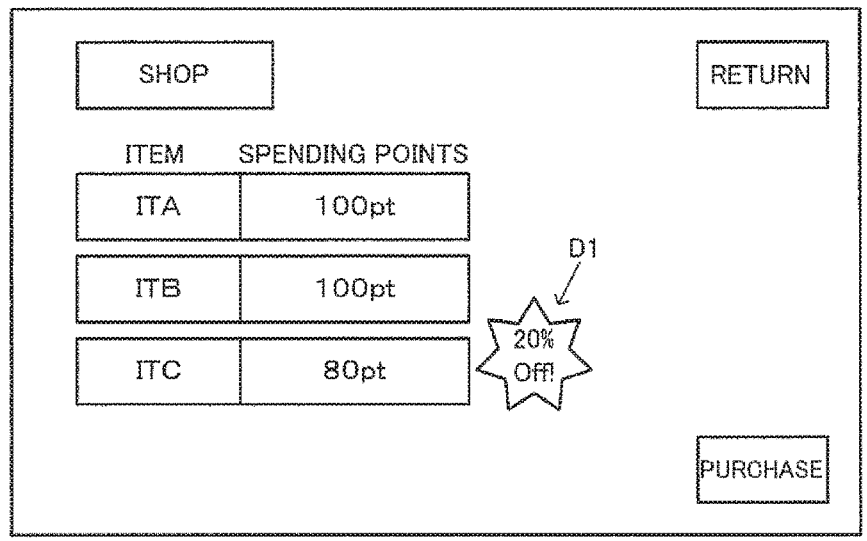
FIG. 7A and FIG. 7B each illustrate a special shop for items.
Figure 7B:
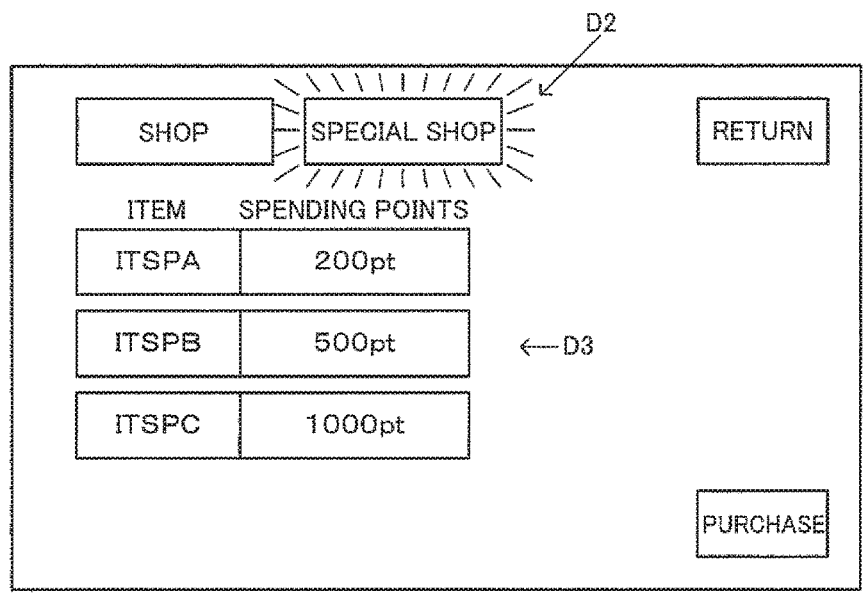

FIG. 6B, FIG. 7A, and FIG. 7B each illustrate a shop screen that is an example of a special shop of an item.

In one method according to the present embodiment, the special shop appears by changing the regular shop into the special shop. In the example illustrated in FIG. 6B, a special item ITSP denoted by C3 can be purchased in addition to the lineup of items in the regular shop illustrated in FIG. 6A. Thus, the regular shop in FIG. 6A and the special shop in FIG. 6B are different from each other in their lineups due to the item ITSP, and thus the special shop in FIG. 6B can be regarded as being implemented by changing the regular shop in FIG. 6A.

The item ITSP purchasable in the special shop has a special effect, for example. For example, with the item ITSP, the user can be in an advantageous game condition during the game event in the battle game or the like in FIG. 5. For example, the item ITSP has an effect of largely damaging the enemy character CE1, CE2, or CE3 or effectively defending the enemy attacks. For example, when the enemy characters CE1, CE2, and CE3 have a fire attribute, an item with a water attribute, advantageous over the fire attribute, appears as the special item ITSP in the special shop in FIG. 6B. The item ITSP in the special shop may be what is known as a rare item that many users want to obtain.

The special shop in FIG. 7A also appears by changing the regular shop into the special shop. In an example illustrated in FIG. 7A, an item ITC has a 20% discount. Specifically, the item ITC requiring 100 points of the virtual currency to be purchased in the regular shop in FIG. 6A can be purchased for less (80 points) in FIG. 7A. As described above, the special shop appearing in FIG. 7A is obtained by changing a regular shop with a detail of an item sold in the regular shop changed.

In another method according to the present embodiment, the special shop appears by selecting one of a plurality of special shops. Specifically, the special shop appears through a process that selects one of a plurality of special shops with different settings on obtainable items.

For example, as illustrated in D2 in FIG. 7B, a special shop different from the regular shop in FIG. 6A has newly appeared. As illustrated in D3, in this special shop, special items ITSPA. ITSPB, and ITSPC unique to the special shop are purchasable. For example, the items ITSPA. ITSPB, and ITSPC make the user advantageous in a game even in the battle game illustrated in FIG. 5 or the like, as in the case of the item ITSP in C3 in FIG. 6B. Alternatively, the items are what are known as rare items that are difficult to obtain.

Figure 8A:
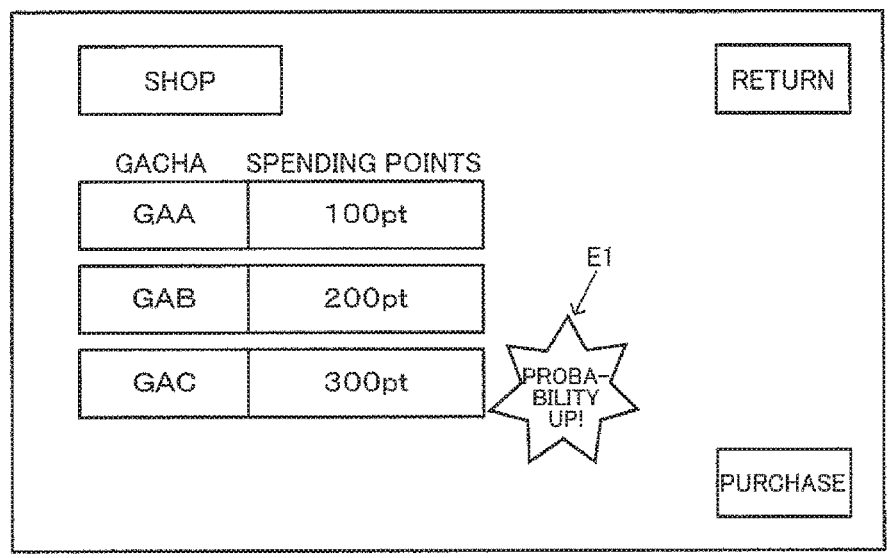
FIG. 8A and FIG. 8B each illustrate a special shop for gacha.
Figure 8B:
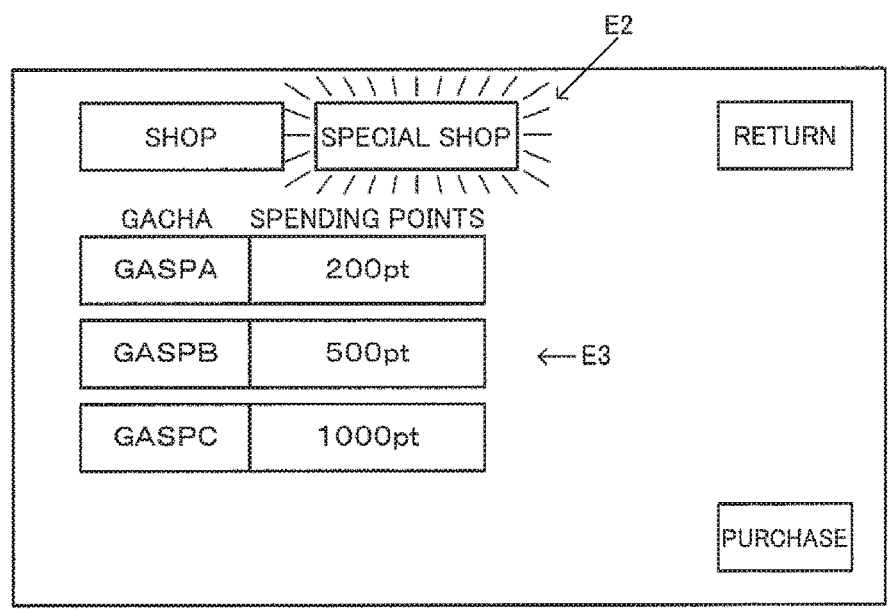

FIGS. 8A and 8B each illustrate an example of a special gacha shop. FIG. 8A illustrates an example of a special shop that appears as a result of changing the regular shop, as in the case of FIG. 7A. As illustrated in E1, the special shop in FIG. 8A offers a higher chance of winning a rare item with gacha GAC. Specifically, the gacha GAC, which is in the lineup of the regular shop, in the special shop features a higher chance of winning a rare item than that in the regular shop. As illustrated in FIG. 9A, the probability of winning a rare item with the gacha GAC in the regular shop is 2% for example, whereas the probability is increased to 10% in the special shop. Thus, the user is more likely to win a rare item with the gacha GAC lottery in the special shop, than in the regular shop with the same 300 points of the virtual currency spent.

In FIG. 8B, the gacha special shop appears with one of the plurality of special shops selected. More specifically, the special shop appears through the process that selects one of the plurality of special shops with different obtainable item settings (for example, the settings on the type of gacha, the probability of winning, and the rare item the user can win in the gacha). For example, as illustrated in E2 in FIG. 8B, a special shop different from regular shops has newly appeared. In this special shop, as illustrated in E3, special gacha GASPA, GASPB, and GASPC, unavailable by the user in the regular shop, are prepared. The user can select a desired one of GASPA, GASPB, and GASPC, and pay the virtual currency to have a chance of acquiring a rare item by playing the gacha with a setting different from that of the gacha in the regular shop. For example, FIG. 9B illustrates an example of a probability of winning the gacha GASPA, GASPB, and GASPC in the special shop. For example, the user can spend 200 and 500 points of the virtual currency to respectively play the special gacha GASPA and GASPB with high probability (5% and 20%) of winning. Furthermore, for example, the user can spend 1000 points of the virtual currency to play the special gacha GASPC with an extremely high probability (50%) of winning.

As described above, the user can obtain an item in a special shop by spending the virtual currency to purchase the item as in FIGS. 6B to 7B, or by performing a lottery process for winning an item with the virtual currency spent as illustrated in FIG. 8A and FIG. 8B.

FIG. 10 illustrates an example of the virtual currency purchase information. This purchase information is associated with the user ID (IDY in FIG. 10), for example. With the purchase information thus associated with the user ID, the management section 616 in FIG. 2 can manage the purchase information of the virtual currency of the user in association with the user information.

As illustrated in FIG. 10, the purchase information may include information on the purchase amount (purchase quantity) of the virtual currency. The information on the purchase amount is stored while being associated with the date and time the virtual currency was purchased, for example. The purchase information may include information on the spending amount (spending quantity) of the virtual currency. The information on the spending amount is stored while being associated with the date and time the virtual currency was spent (paid). The date and time the virtual currency was spent includes: date and time an item was purchased in a shop; and date and time the virtual lottery machine (gacha) was played. The purchase information may further include information on the remaining amount of the virtual currency, a total purchase amount, and a purchase count. The remaining amount of the virtual currency can be calculated based on the purchase amount and the spending amount of the virtual currency and the like. The total purchase amount can be calculated through a process of summing up the purchase amount of the virtual currency and the like. The purchase count is incremented by one each time the virtual currency is purchased, for example. The purchase frequency of the virtual currency can be obtained based on the purchase count. For example, the purchase frequency may be directly derived as the purchase count, or may be obtained based on the purchase count and the purchase amount. For example, the purchase frequency may be set in such a manner that the purchase count involving a larger purchase amount per purchase is evaluated to be a higher frequency than the purchase count involving a smaller purchase amount per purchase. The purchase information is not limited to the example illustrated in FIG. 10, and can be modified in various ways.

FIG. 11 illustrates an example of shop information. The shop information may include a shop ID. The shop ID is ID information on a shop prepared in the system, and is information for identifying a shop. The shop information may include information on the type and rank of a shop. The type of a shop is for defining the type or the like of the shop. For example, an item shop and a virtual lottery machine shop are classified into different types. The type of a shop may be set in accordance with items sold, the type of virtual lottery machine, and the like, for example. The rank of a shop is for setting the class or rarity of the shop. For example, in FIG. 11, rank C, rank B, rank A, and rank S (RKC, RKB, RKA, and RKS) are prepared as shop ranks, with the rank C corresponding to the lowest class (rarity) and the rank S corresponding to the highest class. The shop information may include information such as an item list or a virtual lottery machine list, appearance period information, and an appearance flag. The item list and the virtual lottery machine list are information for defining items and virtual lottery machines prepared in a shop lineup. Thus, the items and virtual lottery machines available in a shop are set with the lists. The appearance period information is information for defining an appearance period (open period) of a shop. With the appearance period information, the length, the timing, and the like of the appearance period of a shop are set. For example, the appearance flag is set to appear for the special shop that has appeared, and is set not to appear for a special shop that has not appeared yet.

With the shop information illustrated in FIG. 11, a special shop can appear through selection from a plurality of special shops with different settings on obtainable items. For example, with the shop information illustrated in FIG. 11, a plurality of special shops with different settings on obtainable items are prepared. Then, the special shop to appear is selected from the plurality of special shops based on a virtual currency purchase status described later, for example. As used herein, the different settings on obtainable items indicate differences in details of the item lists and the virtual lottery machine lists in the shop information illustrated in FIG. 11, for example, or may indicate differences in the types, ranks, or the appearance period information of the shops.

In the present embodiment as described above, a special shop different from regular shops appears based on virtual currency purchase information on a user. For example, the special shops as illustrated in FIG. 6B to FIG. 8B appear based on the purchase information illustrated in FIG. 10. For example, a special shop appears when the virtual currency purchase amount of the user exceeds a given amount. Alternatively, a special shop may appear when the virtual currency total purchase amount of the user exceeds a given amount, or the virtual currency purchase frequency (the purchase count) of the user exceeds a given frequency. The purchase amount, the total purchase amount, and the purchase frequency can be acquired based on the purchase information illustrated as an example in FIG. 10.

For example, conventional systems involving the use of a virtual currency have failed to effectively encourage the user to spend the purchased virtual currency. Thus, the user who has purchased the virtual currency is reluctant to spend the virtual currency, resulting in the virtual currency stock remained unused. Thus, the user having a sufficient amount of the purchased virtual currency stocked does not purchase additional virtual currency. As a result, efficient charge process has been unable to be achieved, due to the pending of the charging in response to the purchasing of the virtual currency by the user.

In view of this, the method according to the present embodiment features a special shop, different from regular shops, appearing based on the purchase information including the virtual currency purchase amount of the user. As illustrated in FIG. 6B to FIG. 8B, the special shop has items and virtual lottery machines, with different settings from the regular shops, prepared in a lineup. The items prepared in the special shop provide an effect of making a user advantageous in a game event in a battle game or the like played by the user, or have a high rarity. Furthermore, the virtual lottery machine prepared in the special shop has more beneficial setting regarding the probability of winning the lottery or the like as illustrated in FIG. 9A and FIG. 9B. Thus, the user is motivated to obtain an item in the special shop thus having appeared, and thus is encouraged to actively spend the purchased virtual currency. For example, the virtual currency is spent to purchase the item in the special shop or play a lottery with the virtual lottery machine in the special shop. Thus, the virtual currency stocked by the user is spent. As a result, for example, the remaining amount of the virtual currency drops to 0 or comes close to 0, and the user who wants an item in the special shop further purchases the virtual currency. Thus, the virtual currency purchased by the user can be prevented from remaining unused and stocked. All things considered, efficient charge process can be achieved with charging to the user due to the purchasing of the virtual currency encouraged.

In the present embodiment, for example, a special shop appears as a result of changing a regular shop into the special shop. Thus, the special shop to appear can be prepared simply by partially changing the lineup and the like of the regular shop, whereby an attempt to simplify a process that makes the special shop appear and to reduce a processing load can be facilitated.

Alternatively, in the present embodiment, a special shop appears through selection from a plurality of special shops with different settings on obtainable items. Thus, various special shops with different settings on obtainable items (the lineup, type, rank, rarity, or effect of the items, or probability of winning the items) can be prepared, and a special shop selected therefrom can appear to be provided to the user. With this configuration, a wider variety and the like of special shops can be provided to the user.

Various modifications can be made on the settings on the items and virtual lottery machines in the special shop. For example, the special shop may differ from regular shops not only in the lineup or the content of the items and the virtual lottery machines, but also in the quantity of stocks, the types, and the like of the items and the virtual lottery machines.

2.2 Process Corresponding to Virtual Currency Purchase Status

In the present embodiment, various types of processes are performed in accordance with the virtual currency purchase status. For example, in the present embodiment, a process that sets a special shop to appear is performed in accordance with the virtual currency purchase status of the user. For example, the virtual currency purchase status is a purchase amount, a total purchase amount, a purchase frequency, a purchase timing, or the like of the virtual currency. The purchase amount, the total purchase amount, the purchase frequency, and the purchase timing can be identified with the virtual currency purchase information in FIG. 10. Thus, a special shop can appear in accordance with the special shop to effectively motivate the user to purchase the virtual currency.

For example, in the present embodiment, a special shop in which an item can be more advantageously obtained appears for a larger purchase amount or a larger total purchase amount of the virtual currency or for a higher purchase frequency for the virtual currency. Alternatively, a special shop in which an item can be more advantageously obtained may appear for an earlier purchase timing of the virtual currency. For example, a special shop with more advantageous settings appears for a user who has purchased the virtual currency immediately after logging into the game. Thus, a special shop in which an item can be more advantageously obtained appears for a larger purchase amount or a larger total purchase amount of the virtual currency, a higher purchase frequency, or an earlier purchase timing. Thus, the user is likely to purchase a larger amount of the virtual currency and quickly purchase an item. Thus, the user can be effectively motivated to purchase the virtual currency.

Figure 12:
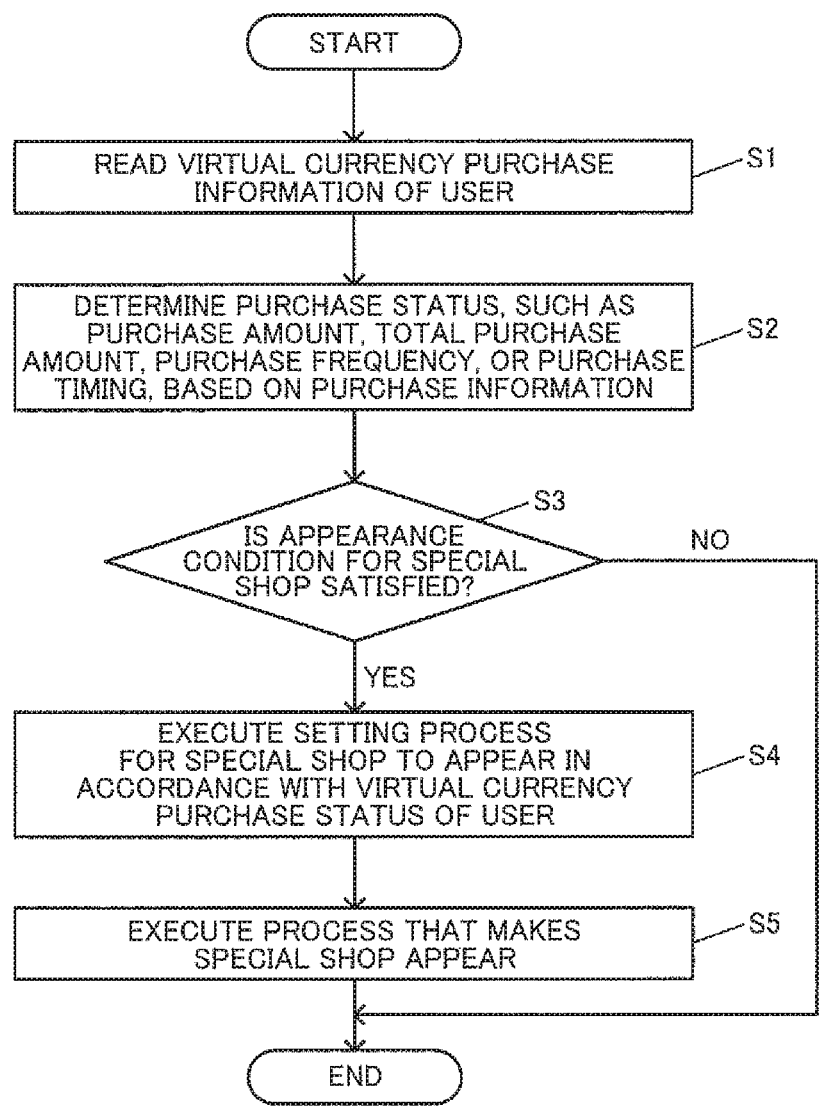
FIG. 12 is a flowchart illustrating a process that sets a special shop in accordance with a virtual currency purchase status.

FIG. 12 is a flowchart illustrating the setting process for a special shop performed in accordance with a virtual currency purchase status.

First of all, virtual currency purchase information on the user is read (step S1). For example, the purchase information, as illustrated in FIG. 10, associated with the user information (user ID) is read from the user information storage section 678 (a storage section in a broad sense) in FIG. 2. Then, a purchase status, such as the purchase amount, the total purchase amount, the purchase frequency, or the purchase timing, is determined based on the purchase information thus read (step S2). For example, an evaluation value for the virtual currency purchase status as described later is obtained.

Next, whether an appearance condition for a special shop is satisfied is determined (step S3). For example, the appearance condition for a special shop is determined to be satisfied, when the user has purchased a given amount of the virtual currency or more, or in other like situations. When the appearance condition is satisfied, the process that sets a special shop to appear in accordance with the virtual currency purchase status of the user is performed (step S4). For example, whether to make the special shop appear by changing a regular shop or through selection from a plurality of special shops is determined. Alternatively, the lineup of items and the virtual lottery machines in the special shop to appear is set. Alternatively, the type, the rank, or the appearance period of the special shop to appear is set. Then, the process that makes the special shop thus set appear is performed (step S5). For example, a shop screen of the special shop as illustrated in FIG. 6B to FIG. 8B becomes displayable to the user.

Figure 13:
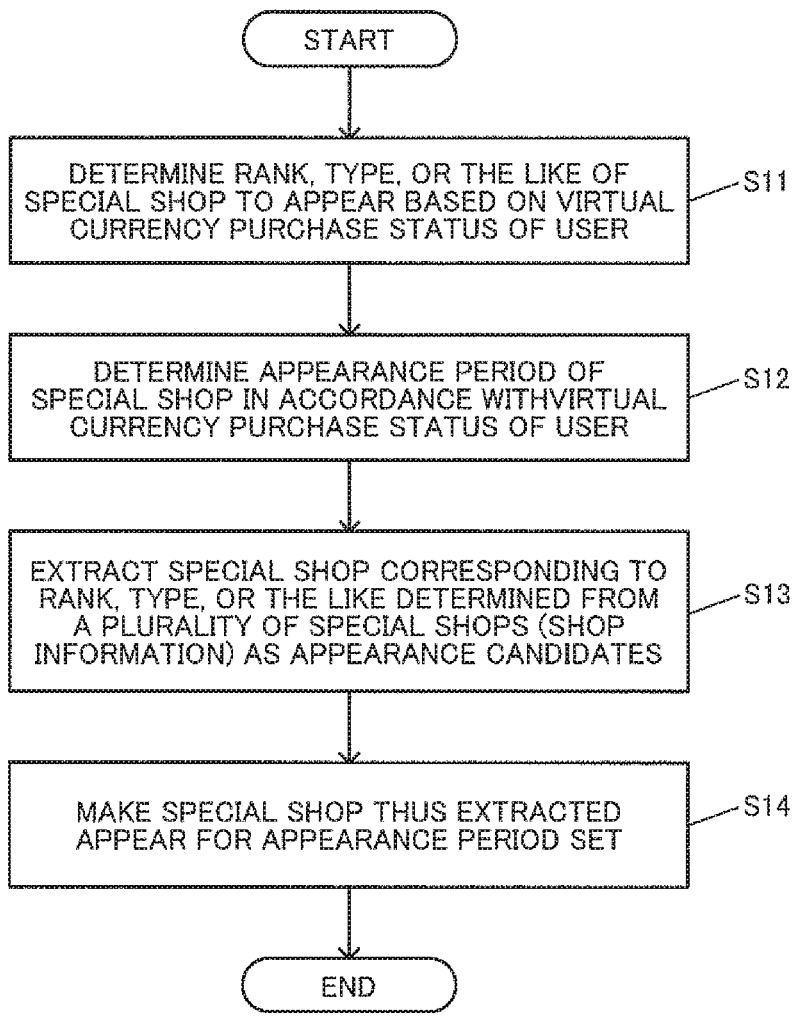
FIG. 13 is a flowchart illustrating an example of a detail of the process that sets the special shop.

FIG. 13 is a flowchart illustrating an example of a detail of the special shop setting process. First of all, the rank, the type, or the like of the special shop to appear is determined based on the virtual currency purchase status of the user (step S11). For example, the rank, the type, or the like of the shop described with reference to FIG. 11 is determined. Furthermore, the appearance period of the special shop is determined in accordance with the virtual currency purchase status of the user (step S12). For example, the length or the timing of the appearance period of the special shop is set.

Then, a special shop corresponding to the rank, the type, or the like thus determined is extracted from a plurality of special shops (the shop information in FIG. 11) as appearing shop candidates (step S13). For example, a special shop with a high rank (for example, with the S or A rank) is selected as a special shop to appear from the shop information in FIG. 11, when the purchase amount, the total purchase amount, or the purchase frequency of the virtual currency of the user is high and the rank of the shop determined in step S11 is high. A special shop with a low rank (for example, with the B or C rank) is selected as a special shop to appear from the shop information in FIG. 11, when the purchase amount, the total purchase amount, or the purchase frequency of the virtual currency of the user is low and the rank of the shop determined in step S11 is low. Then, the special shop thus extracted appears for the appearance period set as described above (step S14). For example, the special shop appears for a long period of time when the appearance period of the special shop set in step S12 is long. When the timing of the appearance period has also been set in step S12, the special shop appears at the timing of the appearance period.

Figure 14A:
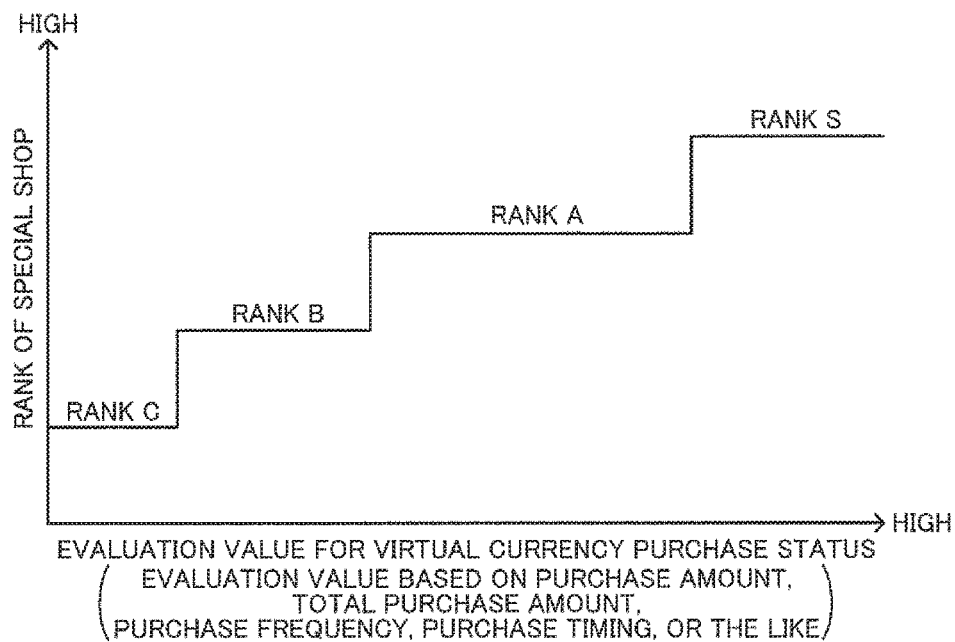
FIG. 14A and FIG. 14B illustrates a process that sets a rank and an appearance period of the special shop, in accordance with the virtual currency purchase status.

FIG. 14A to FIG. 15 illustrate an example of processes performed in accordance with the virtual currency purchase status. For example, in the present embodiment, the evaluation value for the virtual currency purchase status is obtained. For example, the evaluation value can be obtained based on the purchase amount, the total purchase amount, the purchase frequency, the purchase timing, or the like of the virtual currency. For example, the evaluation value is set to be higher with a larger purchase amount, a larger total purchase amount, a larger purchase frequency, or an earlier purchase timing. Thus, the evaluation value is set to be lower with a smaller purchase amount, a smaller total purchase amount, a smaller purchase frequency, or a later purchase timing. In FIG. 14A, the rank of the special shop to appear is set based on the evaluation value for the virtual currency purchase status. Specifically, a special shop with a higher rank appears with a higher evaluation value for the purchase status. In a special shop with a higher rank, a more valuable item (an item with a higher rarity), and an item that can make the user more advantageous in the game or the like can be obtained. Alternatively, a special shop with a higher rank offers a better discount for an item, more abundant stock, or a virtual lottery machine featuring a higher probability of winning an item.

With the rank of the special shop to appear determined to be higher in accordance with an evaluation value for the virtual currency purchase status, a special shop with a higher rank can appear for a user with a higher evaluation value for the purchase status, such as a user who has purchased as a large amount of the virtual currency. Thus, the user who wants to make the special shop with a high rank appear, purchases a larger amount of the virtual currency, and thus can be effectively motivated to purchase the virtual currency.

Figure 14B:
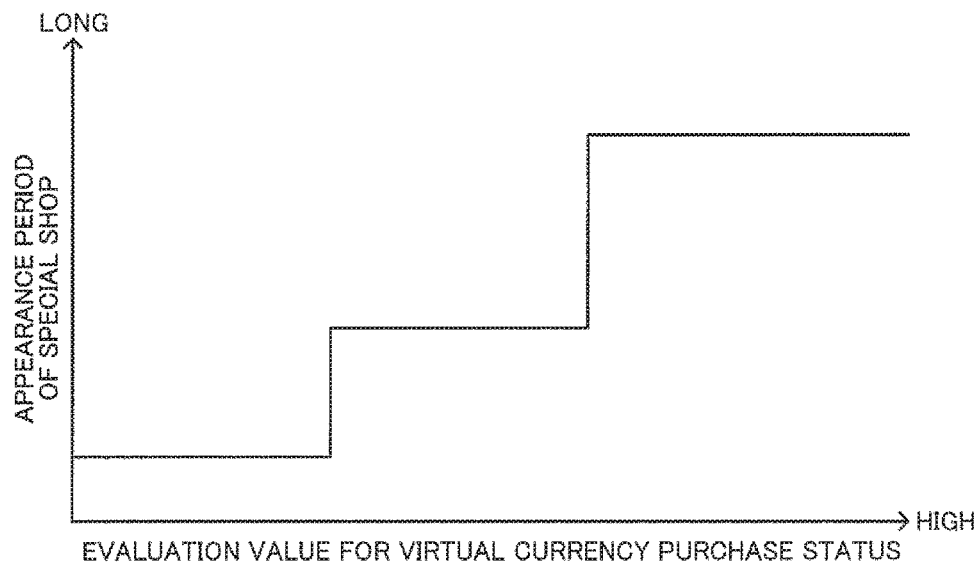

In FIG. 14B, the appearance period of the special shop is set in accordance with the evaluation value for the virtual currency purchase status of the user. Specifically, the appearance period (open period) is set to be longer for a higher evaluation value for the purchase status. For example, the special shop, which is opened only for a given appearance period, may be opened for a longer period of time for the user with a high evaluation value for the purchase status, such as a user who has purchased a large amount of the virtual currency. For example, the appearance period of the special shop is set to be three days for a user with a low evaluation value, and is set to be a week for a user with a high evaluation value. Thus, the process that sets the appearance period of the special shop, reflecting the virtual currency purchase status of a user, can be implemented. The user who wants a longer appearance period of a special shop purchases a larger amount of the virtual currency, and thus can be effectively motivated to purchase the virtual currency.

The variety of the item lineup decreases and item deal becomes less appealing as time elapses during the appearance period of the special shop in FIG. 15. Thus, the user is urged to quickly purchase the item and the like in the special shop, and thus can be effectively motivated to spend the virtual currency.

Then, as illustrated in FIG. 15, with a higher evaluation value for the virtual currency purchase status, a reduction in the variety of the lineup of items and transition to the less profitable sales deal proceed with a smaller rate (amount of change per unit time) along the elapse of time. Thus, the user with a high evaluation value, such as a user who has purchased a large amount of the virtual currency, can enjoy the advantage that the reduction in the variety of the lineup of items and transition to the less profitable sales deal proceed with a smaller rate during the appearance period.

2.3 Process in Accordance with Virtual Currency Spending Status Regarding Special Shop In the present embodiment, various types of processes are performed in accordance with the virtual currency spending status in a special shop. For example, the virtual currency spending status includes a spending amount, a spending timing, a spending frequency, or the like of the virtual currency in the special shop. For example, the virtual currency spending status corresponds to an item purchasing status and a virtual lottery machine playing status in the special shop.

For example, in the present embodiment, a process that sets the game parameter for the game process is performed in accordance with the virtual currency spending status of the user in the special shop. Specifically, the game parameter is changed to a more advantageous setting for a larger spending amount of the virtual currency in the special shop or an earlier spending timing of the virtual currency in the special shop. Thus, the game parameter for the game process changes in various ways in accordance with the virtual currency spending status to encourage the user to spend the virtual currency. Specifically, the game parameter changes to a more advantageous setting with a larger spending amount or an earlier spending timing, thereby encouraging the user to spend a larger amount of the virtual currency or more quickly spend the virtual currency. The spending amount of the virtual currency in the special shop is a purchase amount of an item or a price of playing a virtual lottery machine (an amount paid for a lottery) in the special shop. The spending timing of the virtual currency in the special shop corresponds to the purchase timing of an item or a play timing of the virtual lottery machine in the special shop.

For example, in the present embodiment, a process that sets a parameter of a character corresponding to the user is performed in accordance with the virtual currency spending status of the user in the special shop. For example, a process that sets (changes or the like) a parameter (such as fighting strength and defense) of the character CH or the characters CS1 and CS2 in FIG. 5 is performed. Thus, the virtual currency spending status can be reflected on the parameter of the character of the corresponding user. As a result, the user can spend the virtual currency to set the parameter of his or her character to be more advantageous, and thus can be effectively motivated to purchase the virtual currency.

Figure 16:
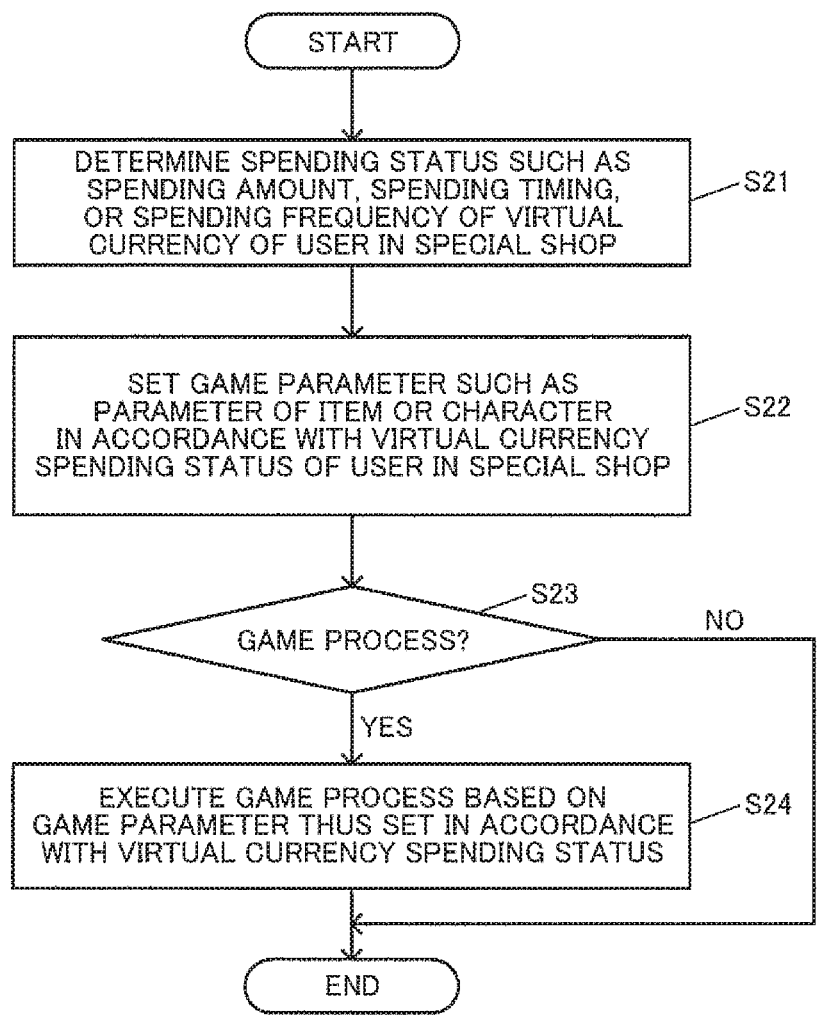
FIG. 16 is a flowchart illustrating a process that sets a game parameter in accordance with a virtual currency spending status.

FIG. 16 is a flowchart illustrating the process that sets the game parameter in accordance with the virtual currency spending status in the special shop.

First of all, the spending status such as the spending amount, the spending timing, or the spending frequency of the virtual currency of the user in the special shop is determined (step S21). For example, an evaluation value for the virtual currency spending status described later is obtained. Then, a game parameter such as a parameter of an item or a character is set in accordance with the virtual currency spending status of the user in the special shop (step S22). For example, the value of the game parameter is changed in various ways based on the virtual currency spending status. Then, the game process is performed based on the game parameter thus set in accordance with the virtual currency spending status (steps S23 and S24). For example, the game parameter is set to be more advantageous for a larger virtual currency spending amount or an earlier virtual currency spending timing in the special shop.

Figure 17:
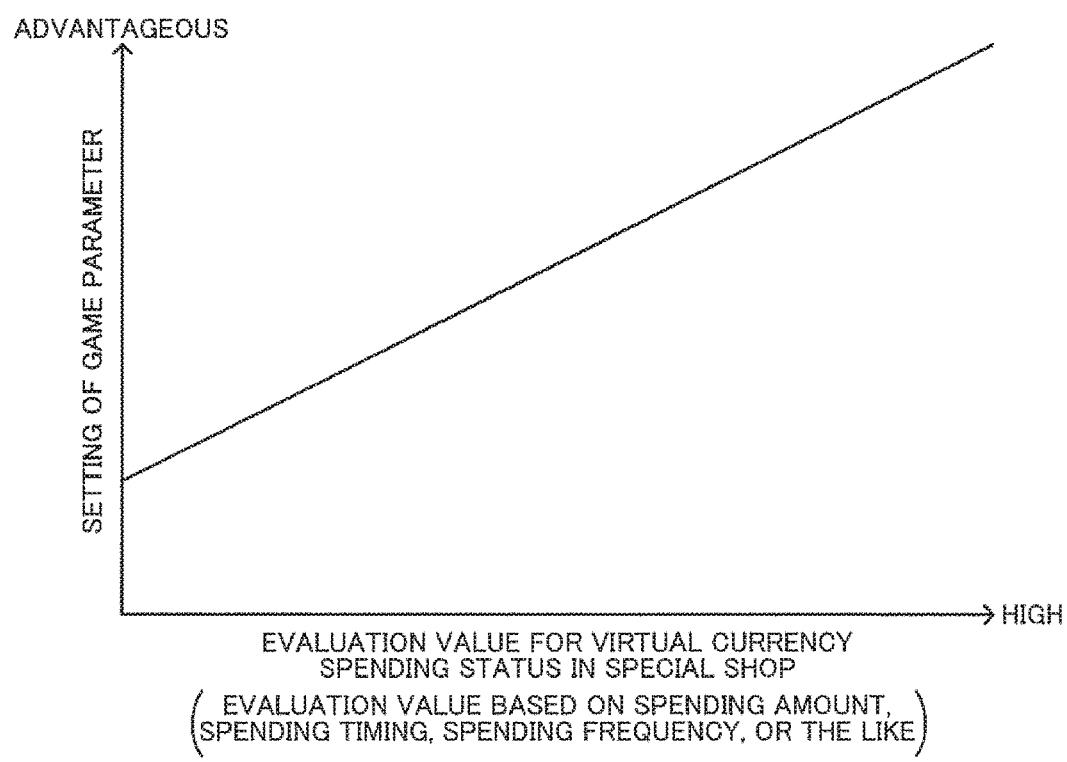
FIG. 17 is a view illustrating a process that sets a game parameter based on the virtual currency spending status.

FIG. 17 is a diagram illustrating a process that sets the game parameter based on the virtual currency spending status in the special shop. For example, in the present embodiment, the evaluation value for the virtual currency spending status in the special shop is obtained. For example, the evaluation value can be obtained based on the spending amount, the spending timing, the spending frequency, or the like of the virtual currency in the special shop. For example, the evaluation value is set to be higher with a larger spending amount, a higher spending frequency, or an earlier spending timing. Thus, the evaluation value is set to be lower with a smaller spending amount, a lower spending frequency, or a later spending timing. For example, the evaluation value for the spending status increases when a larger quantity of items is frequently purchased or a lottery is frequently played with a virtual lottery machine in the special shop that has appeared. The evaluation value for the spending status increases also when the item is purchased or the lottery is quickly played with the virtual lottery machine after the special shop has appeared.

In FIG. 17, the game parameter such as a parameter of an item, a character, or the like, is set based on the evaluation value for the virtual currency spending status. Specifically, the game parameter is set to be more advantageous for a higher evaluation value for the virtual currency spending status in the special shop. For example, the parameter of an item is set to provide more advantageous effect in the game, and a parameter such as the fighting strength and the defense of the character corresponding to the user is increased. Thus, the user with a high evaluation value for the virtual currency spending status can more advantageously play the game. Thus, the user actively spends the virtual currency to purchase the item and play the virtual lottery machine in the special shop that has appeared, and can be effectively motivated to purchase the virtual currency. Thus, for example, when the remaining amount of the virtual currency drops to 0 or comes close to 0, the user further purchases the virtual currency. Thus, the charging to the user due to the purchasing of the virtual currency is prompted, whereby an efficient charge process can be implemented.

Figure 18:
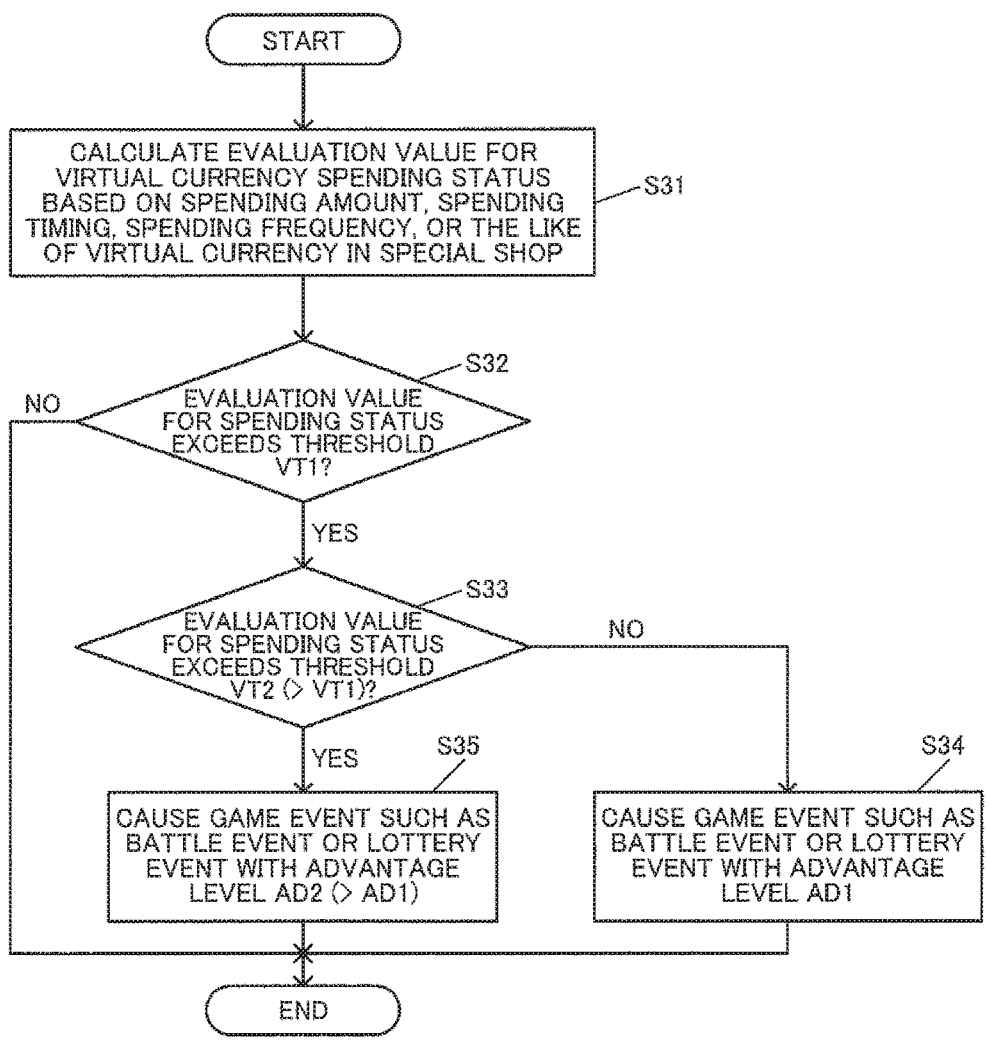
FIG. 18 is a flowchart illustrating a process that progresses a game in accordance with the virtual currency spending status.

In the present embodiment, a process that changes the game progress in accordance with the virtual currency spending status of the user in the special shop may be performed. FIG. 18 is a flowchart illustrating an example of the process that changes the progress of the game in accordance with the virtual currency spending status.

First of all, an evaluation value for the virtual currency spending status is calculated based on the spending amount, the spending timing, the spending frequency, or the like of the virtual currency in the special shop (step S31). Then, whether or not the evaluation value for the spending status has exceeded a threshold VT1 is determined (step S32). The evaluation value is set to be higher for a larger spending amount, a higher spending frequency, or an earlier spending timing. When the evaluation value for the spending status exceeds the threshold VT1, whether or not the value exceeds a threshold VT2, larger than VT1, is determined (step S33). When the evaluation value for the spending status is higher than the threshold VT1 and lower than the threshold VT2, a game event such as a battle event or a lottery event with an advantage level AD1 occurs (steps S33 and S34). When the evaluation value for the spending status exceeds the threshold VT2, a battle event, a lottery event, or the like with an advantage level AD2, higher than AD1, occurs (steps S33 and S35). Thus, in the game event with the advantage level AD2 occurring in step S35, the user can play the battle event in the game more advantageously or play the lottery event with a more advantageous setting than in the game event with the advantage level AD1 occurring in step S34.

With the method according to the present embodiment described above, the game event reflecting the virtual currency spending status of the user in the special shop occurs. Thus, for example, the user who wants more advantageous game events to occur purchases a larger quantity of items and more actively plays the lottery with the virtual lottery machine in the special shop, and thus can be effectively motivated to spend the virtual currency, whereby spending of the virtual currency can be encouraged. Thus, the user further purchases the virtual currency, whereby an efficient charge process for the user can be implemented.

Figure 19A:
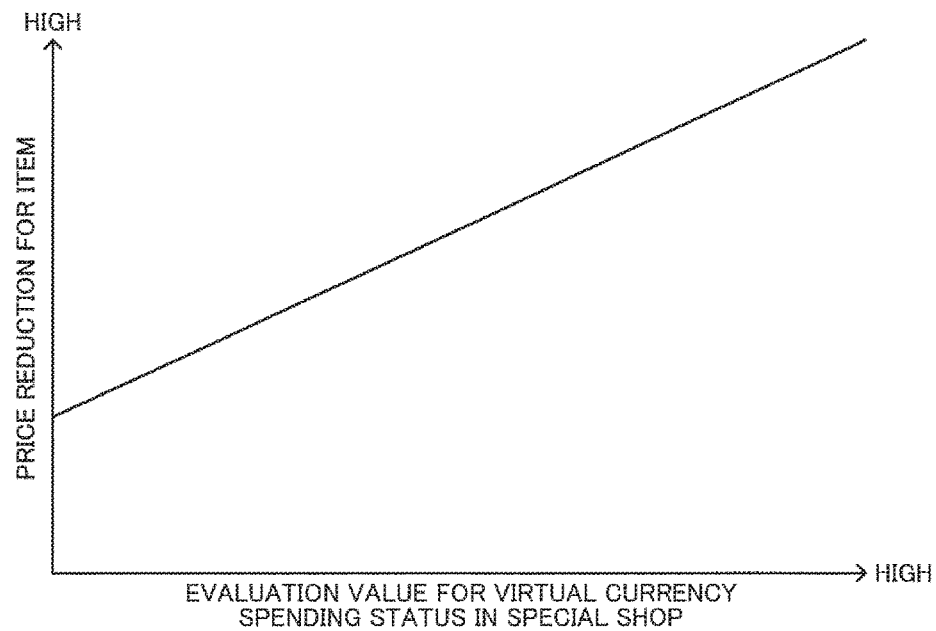
FIG. 19A and FIG. 19B illustrates a process that discounts an item or a process that changes an item obtainable in a special shop, in accordance with the virtual currency spending status.
Figure 19B:
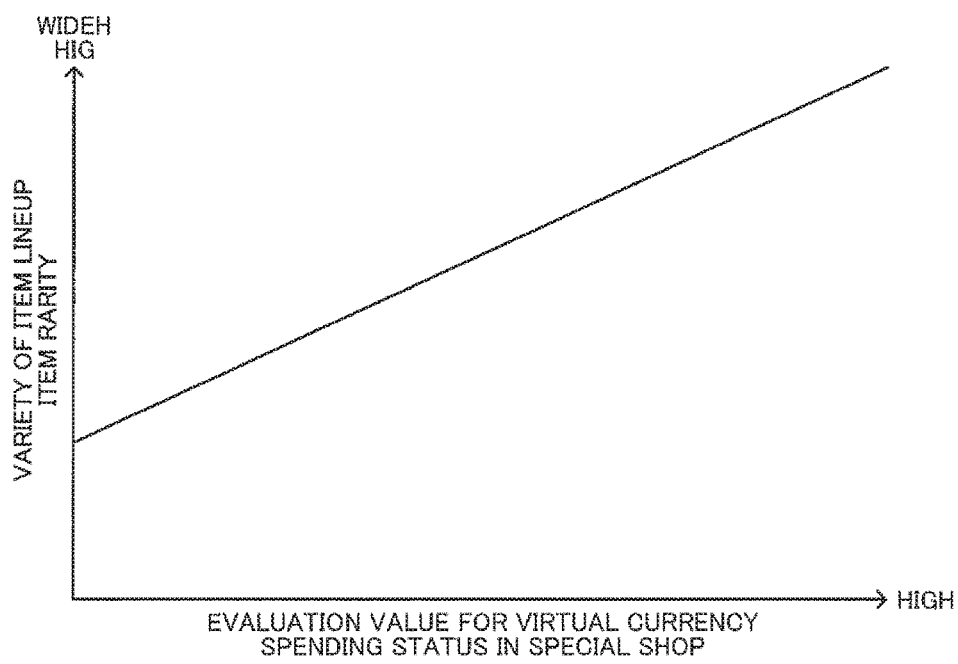

In the present embodiment, a process that reduces the price of an item in the special shop and a process that changes items obtainable in the special shop are performed in accordance with the virtual currency spending status of the user in the special shop. FIG. 19A and FIG. 19B are diagrams illustrating the price reduction process and the change process for the items.

For example, in FIG. 19A, a higher evaluation value for a virtual currency spending status in a special shop leads to a larger reduction in the price of an item in the special shop. Specifically, the price reduction process (discount) for the special shop is performed so that an item can be purchased with a smaller amount of the virtual currency. Alternatively, a process that reduces a price for playing the virtual lottery machine may be performed. Thus, with the price reduction process performed in accordance with the evaluation value for the virtual currency spending status, the user can be motivated by a larger price reduction for the item or the like, to be encouraged to spend the virtual currency in the special shop. Thus, additional purchasing of the virtual currency by the user can be encouraged, whereby an efficient charge process can be implemented.

In FIG. 19B, a higher evaluation value for a virtual currency spending status in a special shop leads to a wider variety of item lineup in the special shop and a higher rarity of the item acquirable in the special shop. Thus, the process that changes items acquirable in the special shop is performed. The process that changes the items acquirable in the special shop can be also implemented with a wider variety of lineup of the virtual lottery machines prepared in the special shop and a higher rarity of an item obtainable by winning the lottery. Thus, with the process that changes the items in accordance with the evaluation value for the virtual currency spending status, the user can be motivated by an increase in the variety of the lineup of the items and an increase in the rarity, to be encouraged to spend the virtual currency in the special shop. Thus, the user can be encouraged to purchase an additional virtual currency, whereby an efficient charge process can be implemented.

Figure 20:
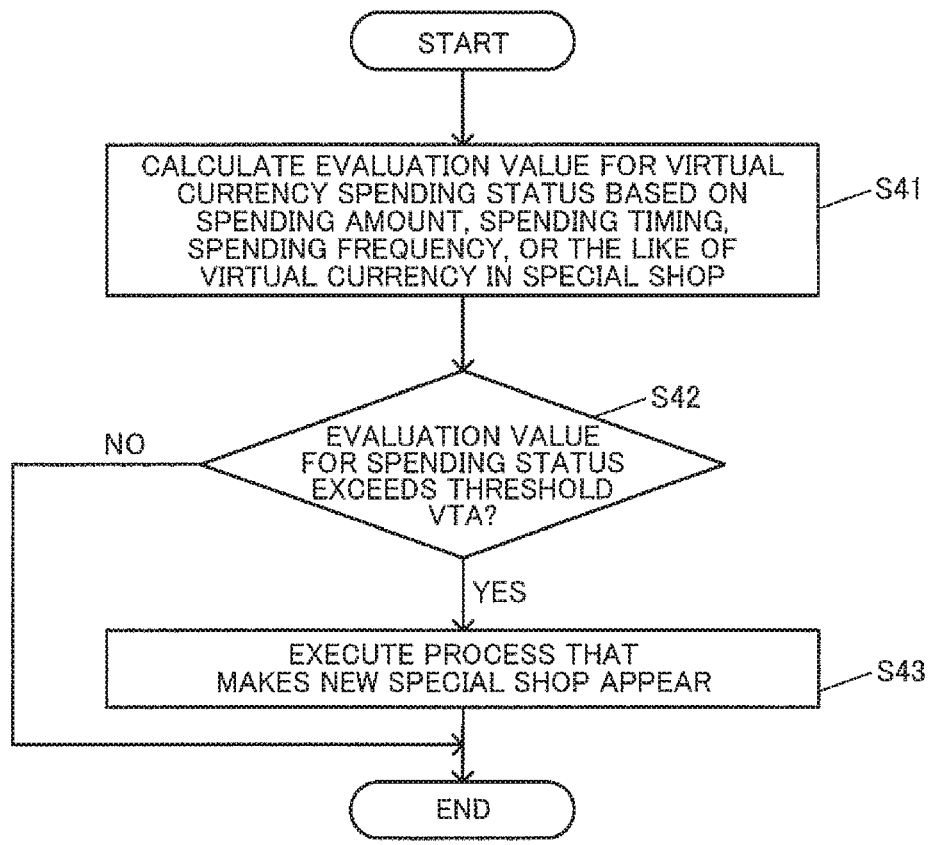
FIG. 20 is a flowchart illustrating a process that makes a new special shop to appear in accordance with the virtual currency spending status.

In the present embodiment, in accordance with the virtual currency spending status of the user in a special shop, a new special shop appears. FIG. 20 is a flowchart illustrating a process that makes the new special shop appear in accordance with the virtual currency spending status.

First of all, the evaluation value for the virtual currency spending status is calculated based on the spending amount, the spending timing, the spending frequency, or the like of the virtual currency in the special shop (step S41). Then, whether or not the evaluation value for the spending status thus calculated exceeds a threshold VTA is determined (step S42). When the evaluation value for the spending status exceeds the threshold VTA, the process that makes the new special shop appear is performed (step S43). For example, a special shop different from a special shop currently appearing appears. For example, this new special shop to appear has a different rank, type, purchasable item, or virtual lottery machine that can be played.

Thus, the user can be motivated to make the new special shop appear, and thus spends a larger amount of the virtual currency to purchase an item and play a virtual lottery machine in the special shop currently that has appeared. Thus, a virtual currency spending spiral can be achieved to encourage the user to purchase an additional virtual currency, whereby an efficient charge process can be implemented.

2.4 Appearance of Special Shop in Accordance with Game Event

In the present embodiment, a given game event occurs due to the game process. When the game event occurs, a special shop appears based on the virtual currency purchase information of the user. For example, the special shop appears when a given game event occurs with the appearance condition based on the virtual currency purchase information of the user satisfied. Specifically, a special shop in which an item corresponding to the occurring game event can be obtained appears, for example.

Figure 21:
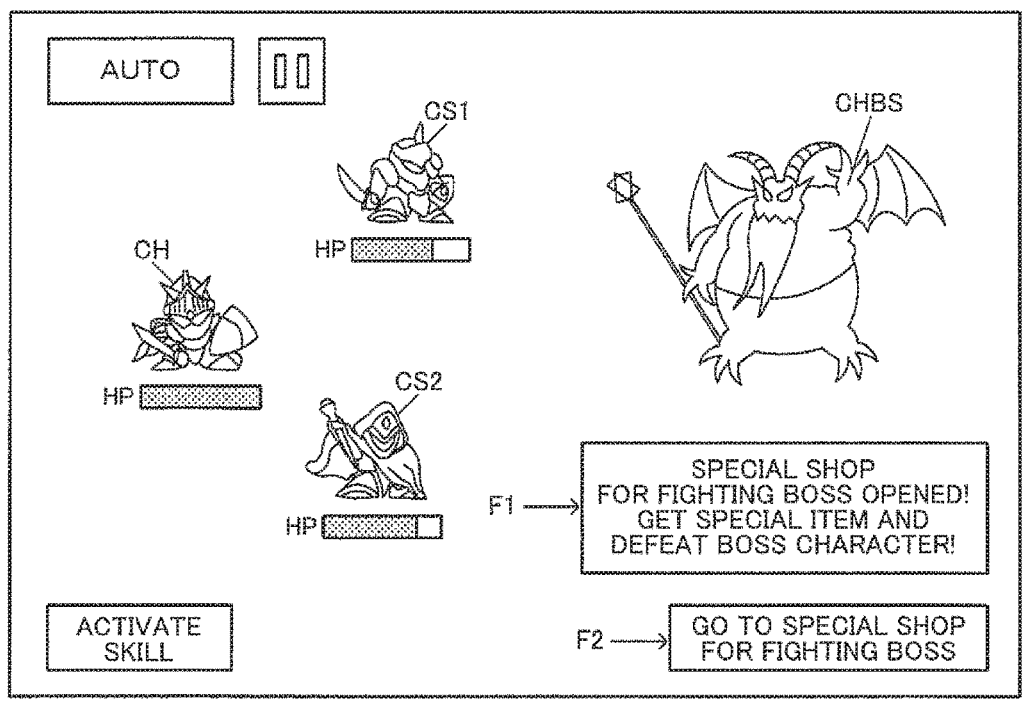
FIG. 21 is a view illustrating a process that makes a special shop appear based on a game event.

For example, in FIG. 21, an event where a boss character CHBS appears occurs as such a game event. For example, a game event where the boss character CHBS appears occurs as a daily event in a network game or the like. The user can obtain a valuable item possessed by the boss character CHBS by defeating the boss character CHBS. For example, a user (or a team of the user) who has first defeated the boss character CHBS, which has appeared, in users playing the network game can obtain all the items possessed by the boss character CHBS. Thus, the users playing the network game are highly motivated to defeat the boss character CHBS, and thus enthusiastically play the battle game for defeating the boss character.

In this process, in the present embodiment, a special shop for fighting the boss, denoted with F1 in FIG. 21, appears. Thus, when the game event as illustrated in FIG. 21 occurs with the appearance condition based on the virtual currency purchase information of the user satisfied, the special shop for fighting the boss appears. Specifically, the user is notified that the special shop for fighting the boss has opened as illustrated in F1, and the user who has checked the notification selects an icon (tab) F2. Thus, the screen can transition to a shop screen of the special shop for fighting the boss.

In this special shop for fighting the boss, an item that can make the user advantageous in the battle against the boss character CHBS can be obtained. Thus, the special shop for fighting the boss has a lineup with such an item prepared. For example, when the boss character CHBS has a fire attribute (a first attribute in a broad sense), an item with a water attribute (a second attribute advantageous over the first attribute in a broad sense) that is advantageous over the fire attribute is prepared in the lineup of the special shop for fighting the boss to be purchasable (obtainable) by the user. When the boss character CHBS has extremely high fighting strength, an item (such as a protection) that can largely increase the defense of the characters CH, CS1, and CS2 of the user can be purchased in the special shop for fighting the boss. When the boss character CHBS has extremely high defense, an item (such as a weapon) that can largely increase the fighting strength of the characters CH, CS1, and CS2 of the user can be purchased in the special shop for fighting the boss. When the boss character CHBS performs poison attack, magic attack, and the like, an item for treating poison and an item that can weaken the magic attack can be purchased in the special shop for fighting the boss.

When such a special shop for fighting the boss appears, the user enthusiastically purchases the items by spending a large amount of the virtual currency in the special shop for fighting the boss to defeat the boss character CHBS, and thus can be effectively motivated to spend the virtual currency, whereby the spending of the virtual currency can be effectively encouraged. Thus, an efficient charge process can be implemented.

In the present embodiment, when the game event as illustrated in FIG. 21 occurs, a special shop in which an item corresponding to the occurring game event can be obtained appears. For example, in FIG. 21, the special shop for fighting the boss appears as the special shop.

The item corresponding to the game event obtainable in the special shop in this case includes various items. For example, the item corresponding to the game event makes the setting of the user more advantageous. For example, the item that makes the setting of the user more advantageous is an item that can make the user finish the game easier. In the example illustrated in FIG. 21, the item makes the setting of the user more advantageous for the battle against the boss character CHBS. For example, the item that makes the setting of the user more advantageous is an item with an advantageous attribute over the attribute of the boss character CHBS. For example, the item that makes the setting of the user more advantageous is an item that increases the defense of the characters CH. CS1, and CS2 of the user when the boss character CHBS has high fighting strength, and is an item that increases the fighting strength of the characters CH, CS1, and CS2 of the user when the boss character CHBS has high defense.

The item corresponding to the game event may be an item to be a target of fusion with the item obtained in the game event. For example, the user who has defeated the boss character CHBS in the battle in FIG. 21 can obtain the item possessed by the boss character CHBS. The special shop for fighting the boss sells an item to be a target of the fusion with the item that has been possessed by the boss character CHBS thus obtained. The user can purchase the item and perform fusion with the item that has been possessed by the boss character CHBS to obtain a more powerful item. Thus, a special item that can make the user play the game advantageously can be obtained.

With such an item being purchasable as the item corresponding to the game event, the user actively purchases the item in the special shop to play the game advantageously and to obtain more valuable items through item fusion. Thus, the user can be encouraged to spend the virtual currency, whereby an efficient charge process can be implemented.

Although the present embodiment is described in detail above, those skilled in the art will readily appreciate that many modifications are possible in the embodiment without materially departing from the novel teachings and advantages of this invention. Accordingly, all such modifications are intended to be included within scope of this invention. For example, any term (e.g., "purchase") cited with a different term (e.g., "obtain") having a broader meaning or the same meaning at least once in the specification and the drawings can be replaced by the different term in any context place in the specification and the drawings. The game process, the purchase process for the virtual currency, the shop process, the management process for purchase information, the appearance process for a special shop, and the like are not limited to those described in the present embodiment, and methods equivalent to those described above in connection with the present embodiment are intended to be included within the scope of the invention.

What is claimed is:

1. A game system comprising:
a processor comprising hardware,
the processor being configured to implement:
a game process for a user to play a game;
a purchase process for the user to purchase a virtual currency;
a management process that manages purchase information of the virtual currency of the user, in association with user information; and
a shop process that performs a setting process for a virtual shop in which the user is able to obtain an item of the game by spending the virtual currency purchased,
wherein the purchase information includes information on a purchased amount, a spending amount, a remaining amount, a total purchased amount, or a purchased count of the virtual currency purchased by the user,
wherein the processor implements the shop process including to:
determine whether current values of the virtual currency actually purchased by the user shown in the purchase information of the user satisfy a predetermined appearance condition for a special shop to appear to the user, wherein the predetermined appearance condition of the special shop is determined based on current values of the purchase information of the virtual currency, which is the purchased amount, the total purchased amount, or the purchased count of the virtual currency of the user; and
make the special shop different from a regular shop appear to the user as the virtual shop, when the current values of the virtual currency actually purchased by the user is determined to satisfy the predetermined appearance condition, wherein the user may spend, in the special shop, the virtual currency purchased by the user,
wherein the processor implements the shop process including making the special shop appear by selecting the special shop from a plurality of special shops with different settings on an obtainable item and with different ranks of the special shops from higher to lower in accordance with a virtual currency purchase status, performing a setting process for the special shop to appear, in accordance with the virtual currency purchase status of the user, and a rank of the special shop to appear is set based on the virtual currency purchase status of the user, the special shop having a higher rank has an item being more advantageously obtainable corresponding to the user with a larger purchased amount or total purchased amount of the virtual currency or with a higher purchased frequency of the virtual currency appear.

2. The game system as defined in claim 1,
wherein the processor implements the shop process including making the special shop appear by changing the regular shop into the special shop.

3. The game system as defined in claim 1,
wherein the processor is further configured to set an appearance period of the special shop to be longer or shorter to correspond to current values of the virtual currency actually purchased by the user shown in the purchase information of the user, and appearance of the special shop to the user is limited to the appearance period.

4. The game system as defined in claim 1,
wherein the processor implements the shop process including enabling the user to obtain an item by spending the virtual currency to purchase the item or spend the virtual currency to perform a lottery process for the item.

5. The game system as defined in claim 1,
wherein the processor implements the game process including performing a setting process that sets a game parameter for the game process in accordance with the virtual currency spending status of the user in the special shop.

6. The game system as defined in claim 5,
wherein the processor implements the game process including changing the setting of the game parameter to be more advantageous for a larger spending amount of the virtual currency or an earlier spending timing of the virtual currency in the special shop.

7. The game system as defined in claim 1,
wherein the processor implements the game process including performing a setting process that sets a parameter of a character corresponding to the user, in accordance with the virtual currency spending status of the user in the special shop.

8. The game system as defined in claim 1,
wherein the processor implements the game process including performing a change process that changes how the game progresses in accordance with the virtual currency spending status of the user in the special shop.

9. The game system as defined in claim 1,
wherein the processor implements the shop process including at least one of: a discount process that discounts an item in the special shop; and a change process that changes an item obtainable in the special shop, in accordance with the virtual currency spending status of the user in the special shop.

10. The game system as defined in claim 1,
wherein the processor implements the shop process including making a new special shop appear, in accordance with the virtual currency spending status of the user in the special shop.

11. The game system as defined in claim 1,
wherein the processor implements the game process including a process that causes a given game event,
wherein the processor implements, when the given game event occurs, the shop process including making the special shop appear based on the purchase information of the virtual currency purchased by the user.

12. The game system as defined in claim 1
further comprising a memory, and the processor is further configured to store, in the memory, the purchase information of the virtual currency of the user in association with the user information.

13. A virtual currency processing system comprising:
a processor including hardware,
the processor being configured to implement:
  a purchase process for a user to purchase a virtual currency;
  a management process that manages purchase information of the virtual currency of the user, in association with user information; and
  a shop process that sets a virtual shop in which the user is able to obtain an item by spending the virtual currency purchased,
wherein the purchase information includes information on a purchased amount, a spending amount, a remaining amount, a total purchased amount, or a purchased count of the virtual currency purchased by the user,
wherein the processor implements the shop process including to:
  determine whether current values of the virtual currency actually purchased by the user shown in the purchase information of the user satisfy a predetermined appearance condition for a special shop to appear to the user, wherein the predetermined appearance condition of the special shop is determined based on current values of the purchase information of the virtual currency, which is the purchased amount, the total purchased amount, or the purchased count of the virtual currency of the user; and
  make the special shop different from a regular shop appear to the user as the virtual shop, when the current values of the virtual currency actually purchased by the user is determined to satisfy the predetermined appearance condition, wherein the user may spend, in the special shop, the virtual currency purchased by the user,
wherein the processor implements the shop process including making the special shop appear by selecting the special shop from a plurality of special shops with different settings on an obtainable item and with different ranks of the special shops from higher to lower in accordance with a virtual currency purchase status, performing a setting process for the special shop to appear, in accordance with the virtual currency purchase status of the user, and a rank of the special shop to appear is set based on the virtual currency purchase status of the user, the special shop having a higher rank has an item being more advantageously obtainable corresponding to the user with a larger purchased amount or total purchased amount of the virtual currency or with a higher purchased frequency of the virtual currency appear.

14. A processing method comprising:
performing a game process for a user to play a game;
performing a purchase process for the user to purchase a virtual currency;
performing a management process that manages purchase information of the virtual currency of the user, in association with user information; and
performing a shop process that sets a virtual shop in which the user is able to obtain an item of the game by spending the virtual currency purchased,
wherein the purchase information includes information on a purchased amount, a spending amount, a remaining amount, a total purchased amount, or a purchased count of the virtual currency purchased by the user,
wherein the shop process includes
  determining whether current values of the virtual currency actually purchased by the user shown in the purchase information of the user satisfy a predetermined appearance condition for a special shop to appear to the user, wherein the predetermined appearance condition of the special shop is determined based on current values of the purchase information of the virtual currency, which is the purchased amount, the total purchased amount, or the purchased count of the virtual currency of the user; and
  making the special shop different from a regular shop appear to the user as the virtual shop, when the current values of the virtual currency actually purchased by the user is determined to satisfy the predetermined appearance condition, wherein the user may spend, in the special shop, the virtual currency purchased by the user,
wherein a computer implements the shop process including making the special shop appear by selecting the special shop from a plurality of special shops with different settings on an obtainable item and with different ranks of the special shops from higher to lower in accordance with a virtual currency purchase status, performing a setting process for the special shop to appear, in accordance with the virtual currency purchase status of the user, and a rank of the special shop to appear is set based on the virtual currency purchase status of the user, the special shop having a higher rank has an item being more advantageously obtainable corresponding to the user with a larger purchased amount or total purchased amount of the virtual currency or with a higher purchased frequency of the virtual currency appear.

15. A non-transitory computer-readable information storage medium storing a program that causes a computer to perform a processing method as defined in claim 14.

16. The game system as defined in claim 1,
wherein the special shop is a shop that appears when the predetermined appearance condition based on the virtual currency purchase information of the user is satisfied and in which the user can obtain the item of the game different from the item of the game in the regular shop by spending the virtual currency, and
wherein the regular shop is a shop in which the user can obtain the item of the game even when the predetermined appearance condition is not satisfied.

17. The game system as defined in claim 1, wherein the shop process further notifies the user, in a notice screen, that the special shop has appeared.

* * * * *